(12) United States Patent
Raghoebardajal et al.

(10) Patent No.: US 11,521,366 B2
(45) Date of Patent: Dec. 6, 2022

(54) MARKER-BASED TRACKING APPARATUS AND METHOD

(71) Applicant: Sony Interactive Entertainment Inc., Tokyo (JP)

(72) Inventors: Sharwin Winesh Raghoebardajal, London (GB); Kenzo Nishikawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 281 days.

(21) Appl. No.: 16/864,413

(22) Filed: May 1, 2020

(65) Prior Publication Data

US 2020/0349378 A1 Nov. 5, 2020

(30) Foreign Application Priority Data

May 3, 2019 (GB) ..................... 1906311

(51) Int. Cl.
*G06V 10/24* (2022.01)
*G02B 27/01* (2006.01)
(Continued)

(52) U.S. Cl.
CPC ....... *G06V 10/245* (2022.01); *G02B 27/0172* (2013.01); *G06T 19/006* (2013.01); *G06V 10/22* (2022.01); *G06V 20/20* (2022.01)

(58) Field of Classification Search
CPC ....... G06V 10/22; G06V 10/245; G06V 20/20
(Continued)

(56) References Cited

U.S. PATENT DOCUMENTS

2015/0062163 A1 3/2015 Lee
2015/0094142 A1* 4/2015 Stafford .................. G06F 3/017
463/31
(Continued)

FOREIGN PATENT DOCUMENTS

EP 1832967 A2 9/2007
GB 2504999 A 2/2014
WO 2016014718 A1 1/2016

OTHER PUBLICATIONS

Extended European Search Report for corresponding EP Application No. 20169687.9, 8 pages, dated Sep. 25, 2020.
(Continued)

*Primary Examiner* — Gabriel I Garcia
(74) *Attorney, Agent, or Firm* — Matthew B. Dernier, Esq.

(57) ABSTRACT

A data processing device comprises an analyser to analyse successive images captured by a camera and to detect an optically detectable marker in the captured images, a first location detector to detect a location of the optically detectable marker with respect to a location of the camera according to a first detection mode and to generate a first detection result, a second location detector to detect the location of the optically detectable marker with respect to the location of the camera according to a second detection mode different to the first detection mode and to generate a second detection result, and a processor to select at least one of the first detection result and the second detection result and to generate data indicative of the location of the optically detectable marker with respect to the location of the camera based on the selection.

15 Claims, 16 Drawing Sheets

(51) Int. Cl.
*G06T 19/00* (2011.01)
*G06V 10/22* (2022.01)
*G06V 20/20* (2022.01)

(58) Field of Classification Search
USPC .......................................................... 382/287
See application file for complete search history.

(56) References Cited

U.S. PATENT DOCUMENTS

2016/0098095 A1* 4/2016 Gonzalez-Banos ..... A63F 13/92
  345/156
2016/0246370 A1   8/2016 Osman
2016/0364910 A1  12/2016 Higgins
2018/0181199 A1   6/2018 Harvey
2018/0299271 A1* 10/2018 Calloway ............. G01C 21/005
2018/0376090 A1* 12/2018 Liu ...................... H04N 5/3745

OTHER PUBLICATIONS

Combined Search and Examination Report for corresponding GB Application No. 1906311.4, 5 pages, dated Nov. 10, 2019.

* cited by examiner

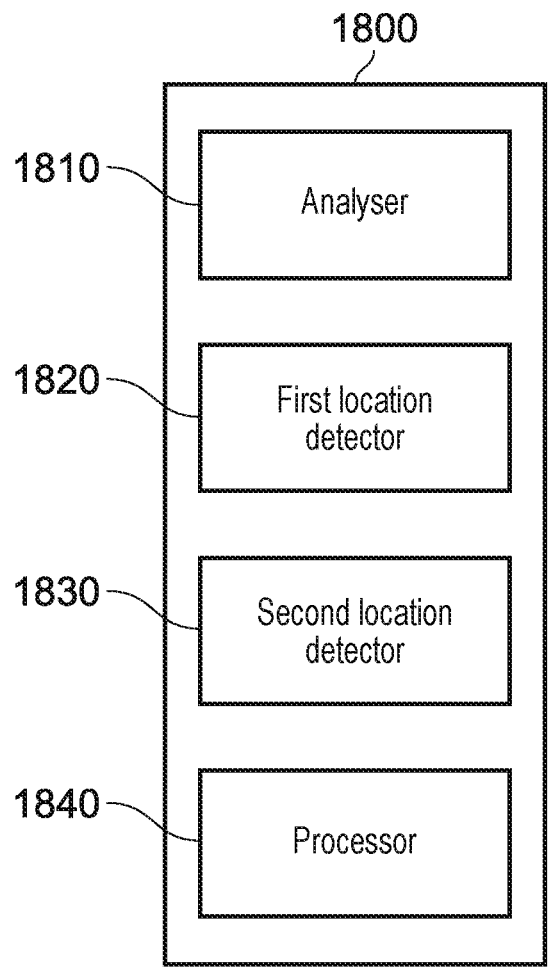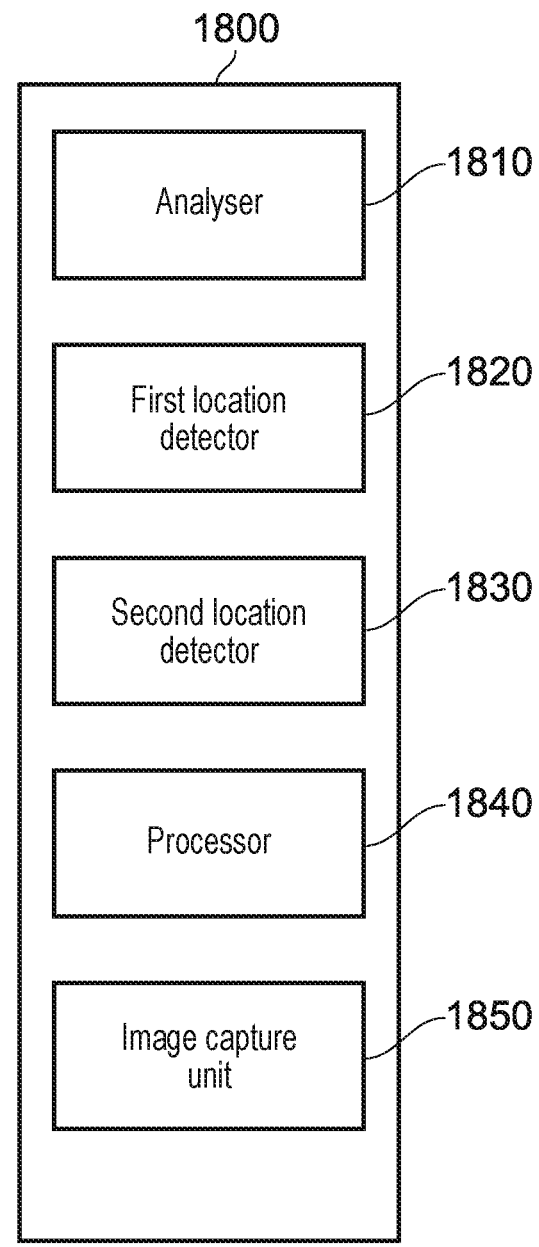

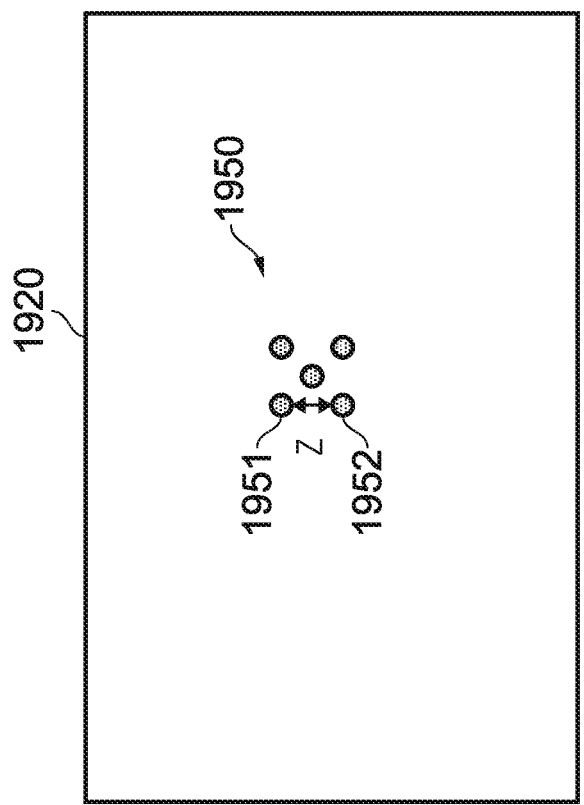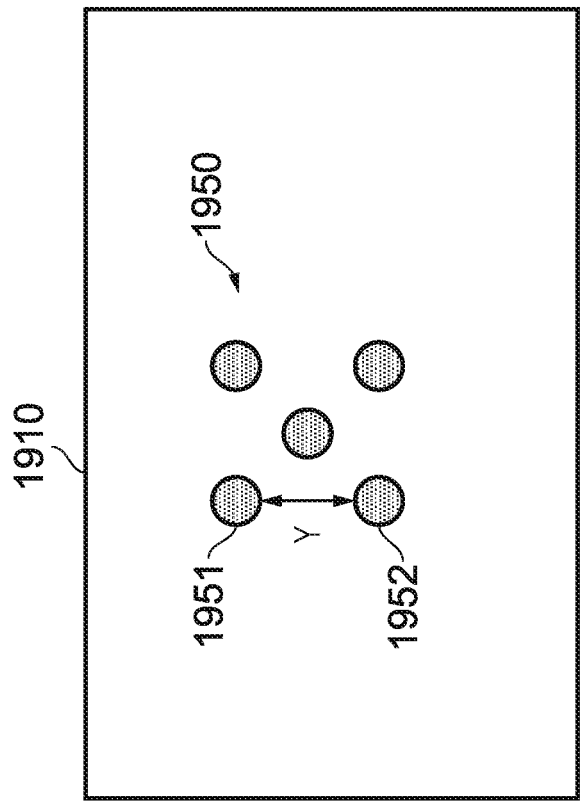
FIG. 19

MARKER-BASED TRACKING APPARATUS AND METHOD

BACKGROUND

Field of the Disclosure

This disclosure relates to virtual reality systems and methods.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus for use in a virtual reality system in which an HMD wearer views a virtual environment. In an HMD, an image or video display device is provided which may be worn on the head or as part of a helmet. Either one eye or both eyes are provided with small electronic display devices.

It has been proposed to provide detection arrangements for detecting a relative location of one device (such as an HMD) from another device, by using a camera on the one device to detect images of one or more markers, for example on the other device.

Although the original development of HMDs and virtual reality was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

An example embodiment provides a data processing apparatus comprising:

an analyser to analyse successive images captured by a camera and to detect an optically detectable marker in the captured images;

a first location detector to detect a location of the optically detectable marker with respect to a location of the camera according to a first detection mode and to generate a first detection result;

a second location detector to detect the location of the optically detectable marker with respect to the location of the camera according to a second detection mode different to the first detection mode and to generate a second detection result; and a processor to select at least one of the first detection result and the second detection result and to generate data indicative of the location of the optically detectable marker with respect to the location of the camera based on the selection.

Another example embodiment provides a method comprising:

analysing successive images captured by a camera;

detecting an optically detectable marker in the captured images;

detecting a location of the optically detectable marker with respect to a location of the camera according to a first detection mode and generating a first detection result;

detecting the location of the optically detectable marker with respect to the location of the camera according to a second detection mode different to the first detection mode and generating a second detection result;

selecting at least one of the first detection result and the second detection result; and generating data indicative of the location of the optically detectable marker with respect to the location of the camera based on the based on the selection.

Example embodiments provide computer software which, when executed by a computer, causes the computer to perform the steps of the methods defined above.

Example embodiments provide a machine-readable, non-transitory storage medium which stores such computer software.

Various other aspects and features of the present disclosure are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 18a schematically illustrates a data processing apparatus for analysing images captured by a camera;

FIG. 18b schematically illustrates another data processing apparatus for analysing images captured by a camera;

FIG. 19 schematically illustrates two images including the same optically detectable marker at different camera-marker separation distances;

DESCRIPTION OF THE EMBODIMENTS

Figure 1:
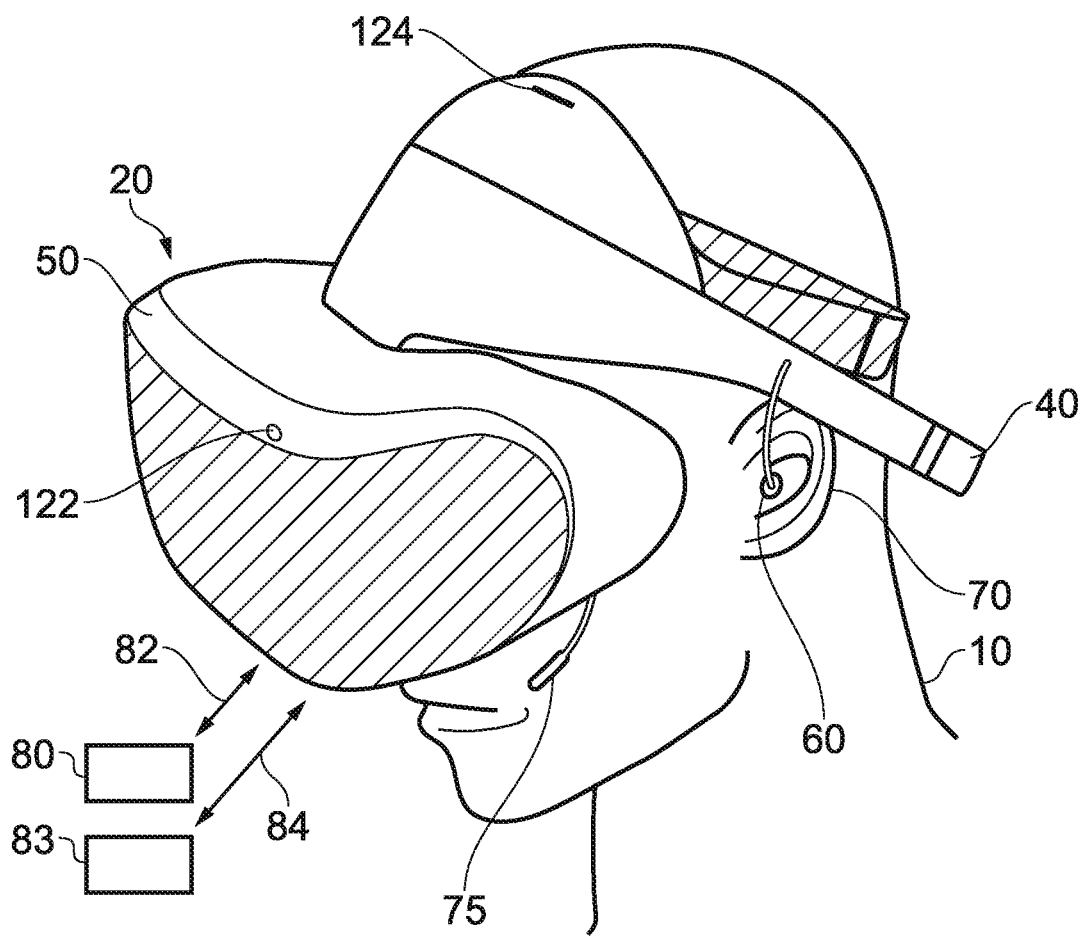
FIG. 1 schematically illustrates an HMD worn by a user.

Referring now to FIG. 1, a user 10 is wearing an HMD 20 (as an example of a generic head-mountable apparatus or virtual reality apparatus). The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes. A boom microphone 75 is mounted on the HMD so as to extend towards the user's mouth.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply;

(d) an HMD having a wireless connection to a video and/or audio signal source and a cabled connection to a power supply; or (e) an HMD having its own video and/or audio signal source and its own power supply (both as part of the HMD arrangement).

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
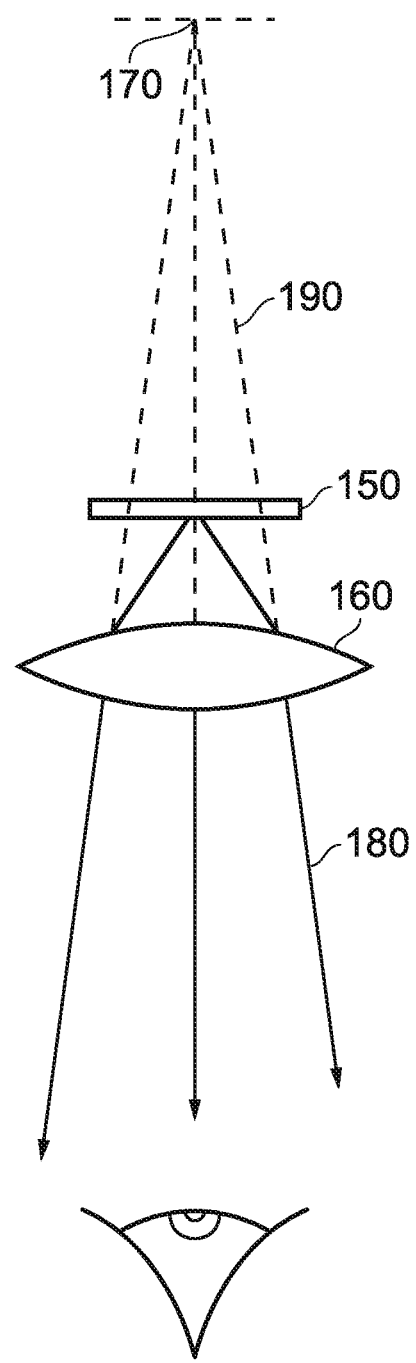
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
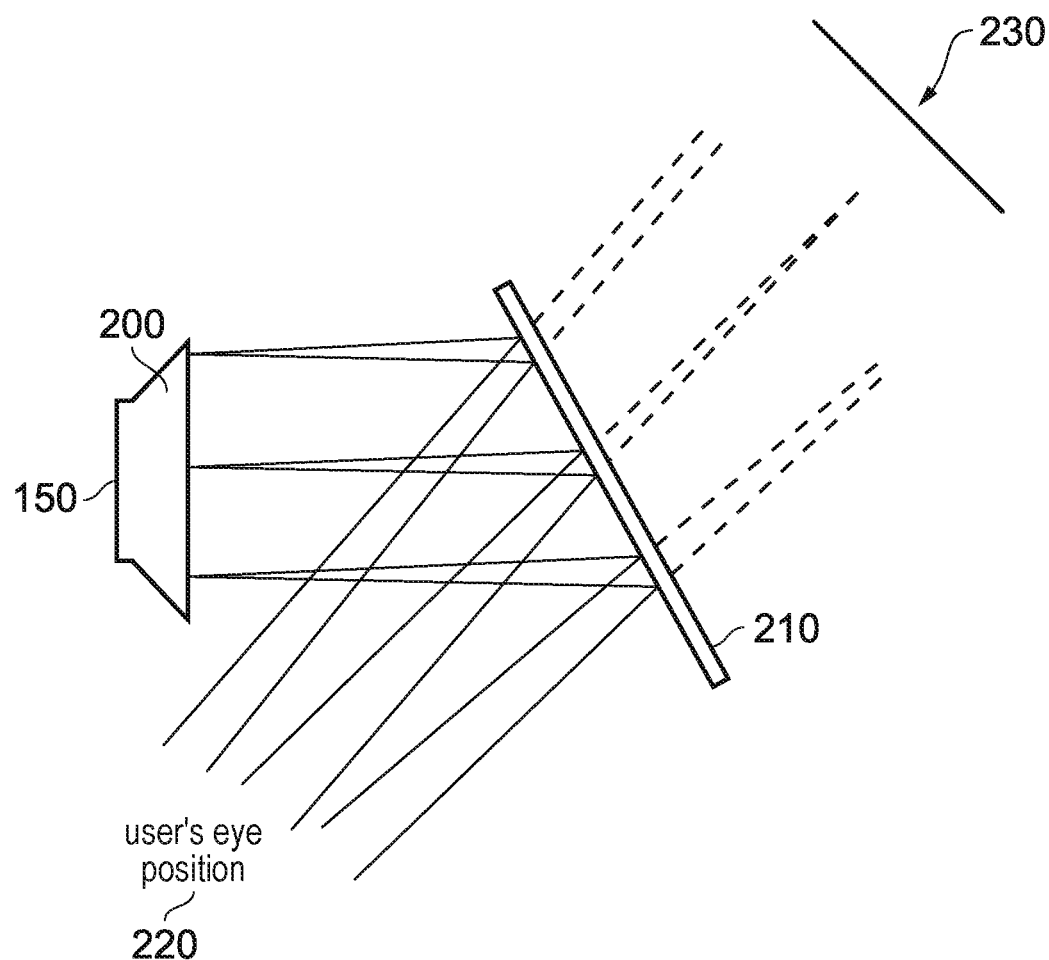
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
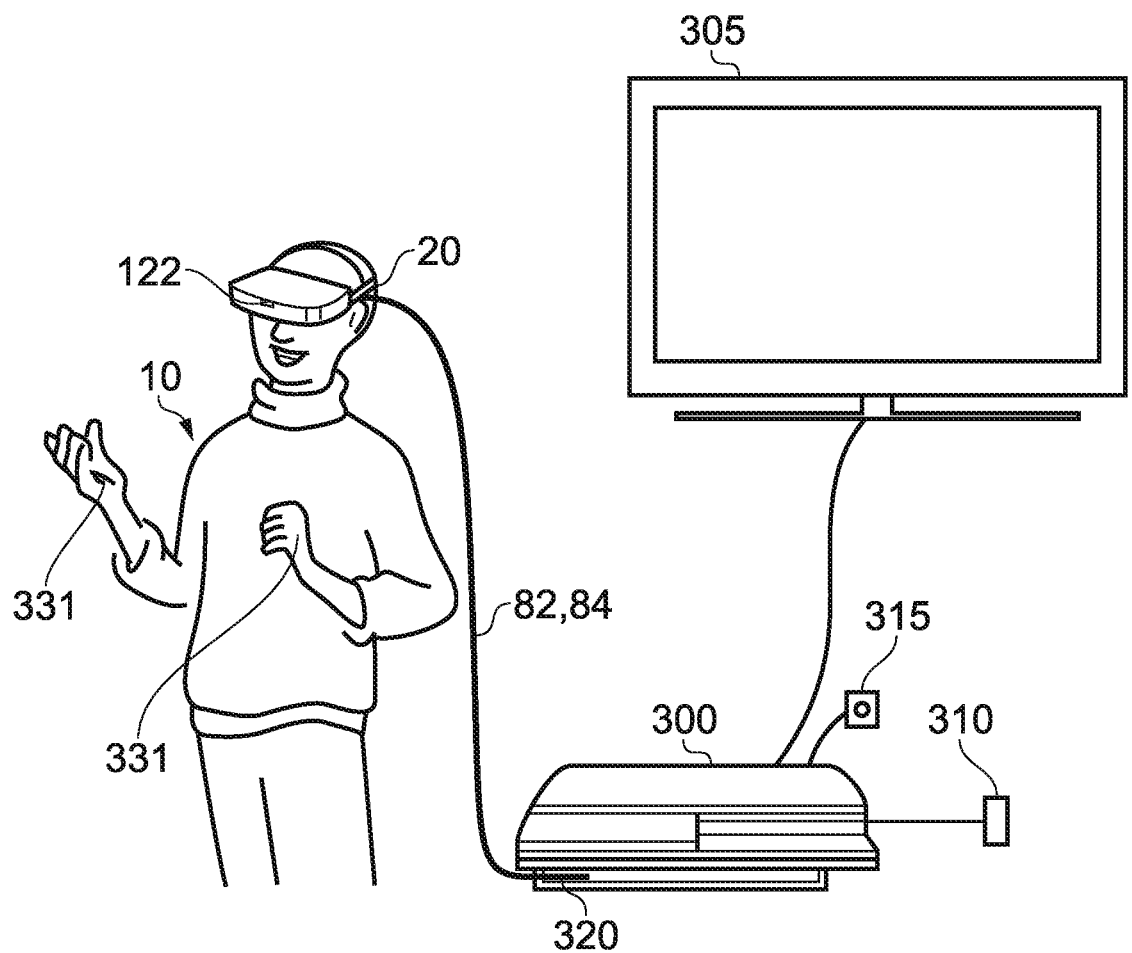
FIGS. 6 and 7 schematically illustrate a user wearing an HMD connected to a Sony® PlayStation 3® games console.

FIG. 6 schematically illustrates an example virtual reality system and in particular shows a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfills the functions of the cables 82, 84.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

FIG. 6 also shows a separate display 305 such as a television or other openly viewable display (by which it is meant that viewers other than the HMD wearer may see images displayed by the display 305) and a camera 315, which may be (for example) directed towards the user (such as the HMD wearer) during operation of the apparatus. An example of a suitable camera is the PlayStation Eye camera, although more generally a generic "webcam", connected to the console 300 by a wired (such as a USB) or wireless (such as WiFi or Bluetooth) connection.

The display 305 may be arranged (under the control of the games console) to provide the function of a so-called "social screen". It is noted that playing a computer game using an HMD can be very engaging for the wearer of the HMD but less so for other people in the vicinity (particularly if they are not themselves also wearing HMDs). To provide an improved experience for a group of users, where the number of HMDs in operation is fewer than the number of users, images can be displayed on a social screen. The images displayed on the social screen may be substantially similar to those displayed to the user wearing the HMD, so that viewers of the social screen see the virtual environment (or a subset, version or representation of it) as seen by the HMD wearer. In other examples, the social screen could display other material such as information relating to the HMD wearer's current progress through the ongoing computer game. For example, the HMD wearer could see the game environment from a first person viewpoint whereas the social screen could provide a third person view of activities and movement of the HMD wearer's avatar, or an overview of a larger portion of the virtual environment. In these examples, an image generator (for example, a part of the functionality of the games console) is configured to generate some of the virtual environment images for display by a display separate to the head mountable display.

In FIG. 6 the user is wearing one or two so-called haptic gloves 331. These can include actuators to provide haptic feedback to the user, for example under the control of processing carried out by the console 300. They may also provide configuration and/or location sensing as discussed below.

Note that other haptic interfaces can be used, providing one or more actuators and/or one or more sensors. For example, a so-called haptics suit may be worn by the user. Haptic shoes may include one or more actuators and one or more sensors. Or the user could stand on or hold a haptic interface device. The one or more actuators associated with these devices may have different respective frequency responses and available amplitudes of vibration. Therefore in example arrangements to be discussed below the haptic generator can be responsive to attributes defining one or capabilities of the haptic interface. In some examples, an attribute defines a frequency response of the haptic interface. In some examples, an attribute defines a maximum amplitude which may be represented by the haptic interface.

Figure 7:
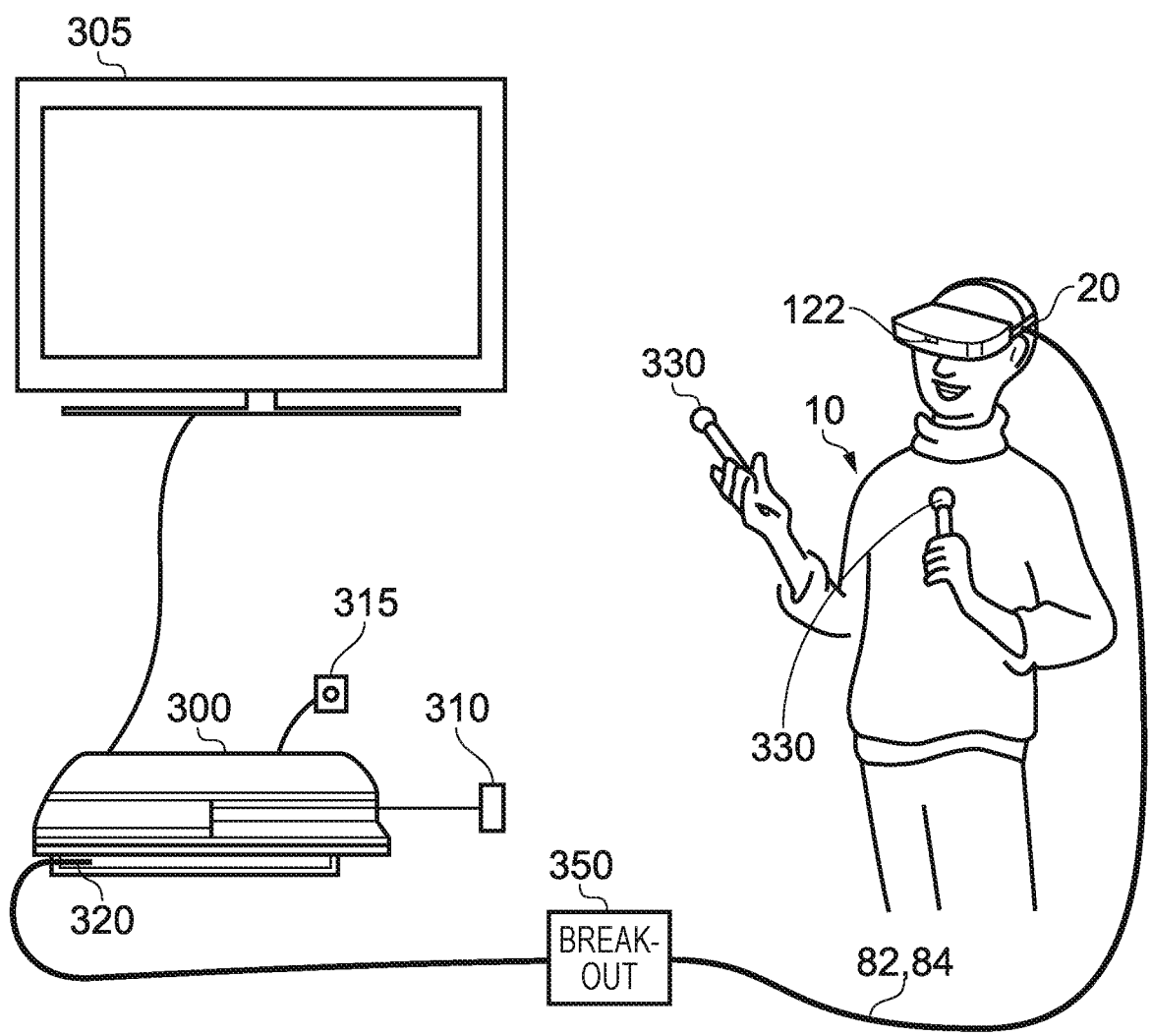

FIG. 7 schematically illustrates a similar arrangement (another example of a virtual reality system) in which the games console is connected (by a wired or wireless link) to a so-called "break out box" acting as a base or intermediate device 350, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

In FIG. 7, the user is also shown holding a pair of hand-held controller 330s which may be, for example, Sony® Move® controllers which communicate wirelessly with the games console 300 to control (or to contribute to the control of) game operations relating to a currently executed game program. The user may also be wearing one or two haptic gloves as discussed in connection with FIG. 6.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
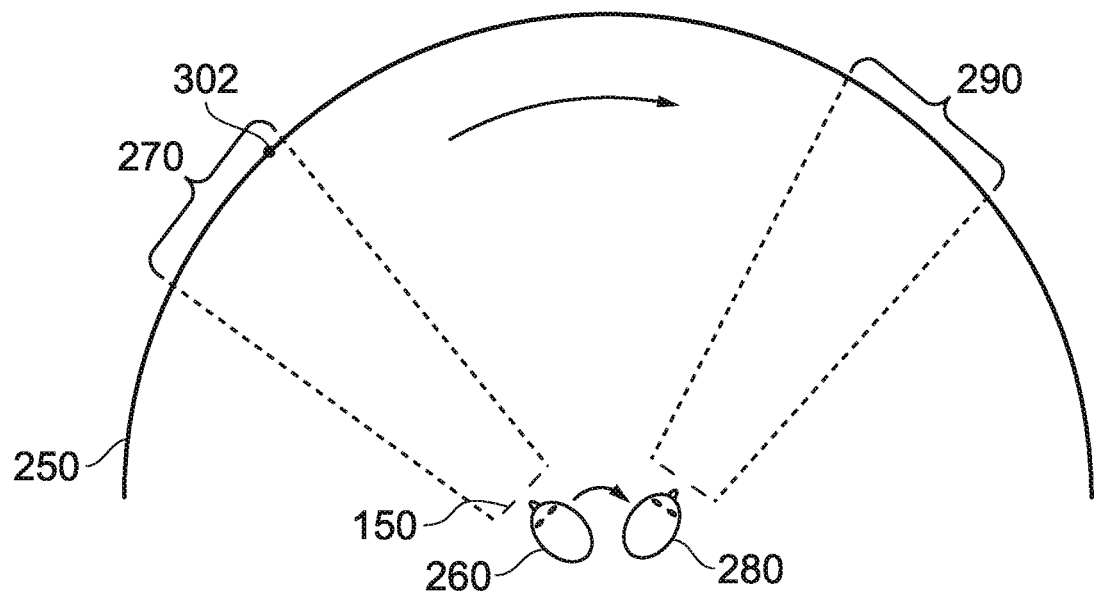
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. This provides an example of a virtual display screen (VDS). Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD. It can be seen from the drawing that the VDS subsists in three dimensional space (in a virtual sense) around the position in space of the HMD wearer, such that the HMD wearer sees a current portion of VDS according to the HMD orientation.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
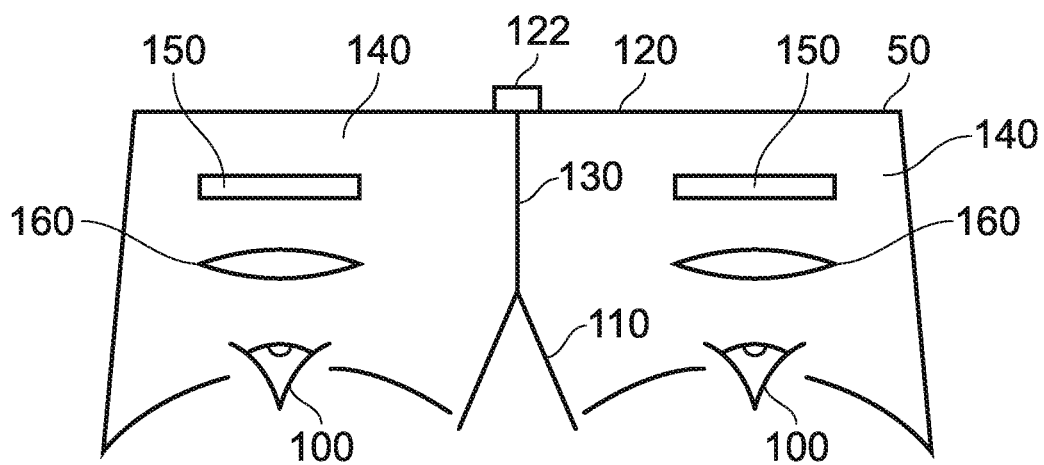
FIG. 2 is a schematic plan view of an HMD.
Figure 9A:
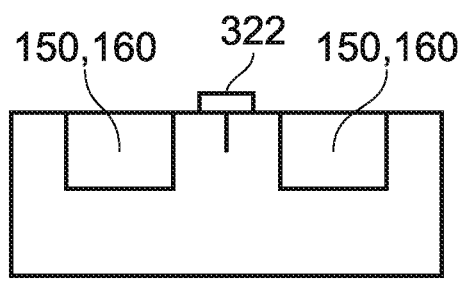
FIGS. 9a and 9b schematically illustrate HMDs with motion sensing.
Figure 9B:
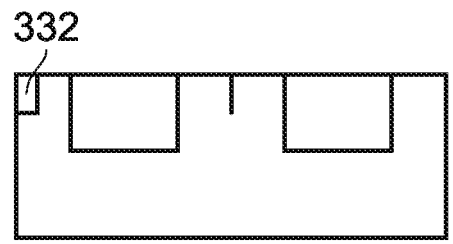

FIGS. 9*a* and 9*b* schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9*a*, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9*b* makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
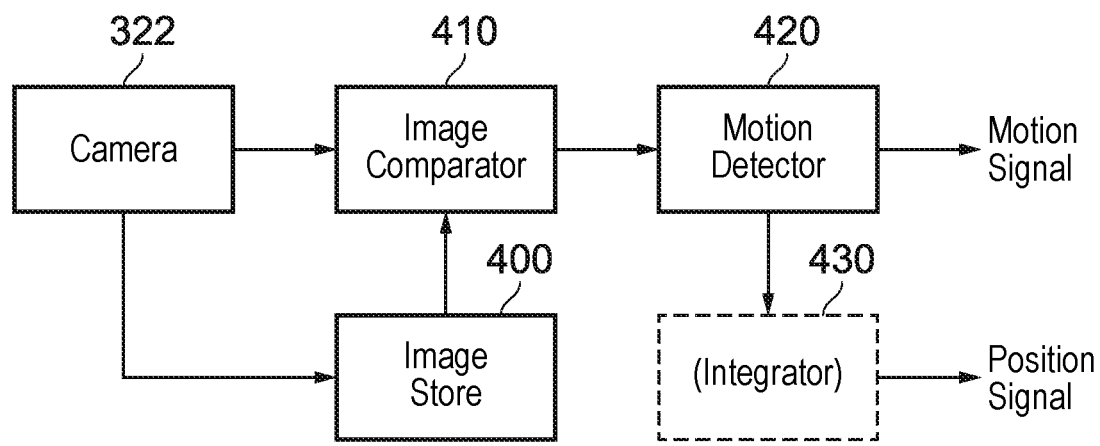
FIG. 10 schematically illustrates a position sensor based on optical flow detection.

FIG. 10 schematically illustrates one example of motion detection using the camera 322 of FIG. 9*a*.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

Alternatively or in addition, absolute tracking of feature points may be used when analysing images captured from a camera mounted on the HMD. Hence for example light emitting diodes or other static image features (including a TV screen for example) may be identified as features and tracked (for example using sub-pixel positions of LED's in the image) to calculate movement of the HMD with respect to these feature points.

Alternatively or in addition, a separate fixed camera 315 may monitor the HMD, which may comprise LEDs or similar light sources itself (see FIGS. 13 and 14, discussed later herein). Video images from this fixed camera may be analysed for absolute tracking of feature points (for example using sub-pixel positions of LED's on the HMD) to calculate motion of the HMD.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
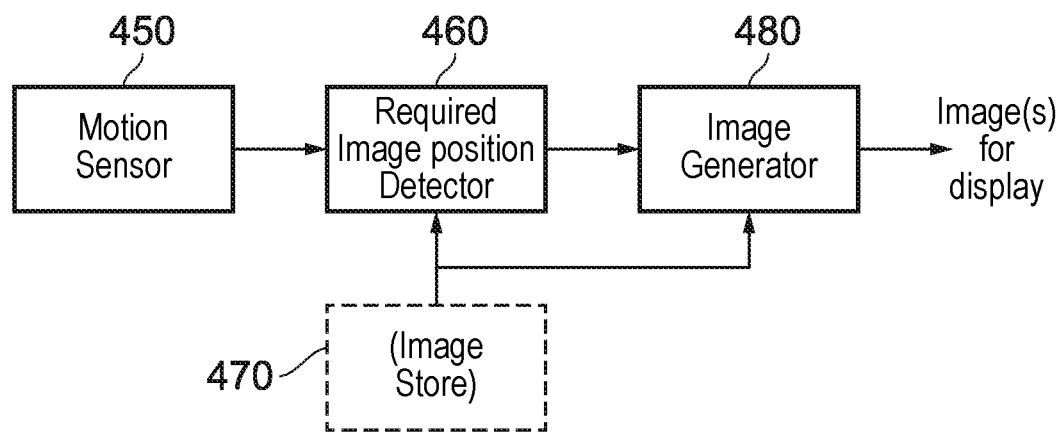
FIG. 11 schematically illustrates image processing carried out in response to a detected position or change in position of an HMD.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9*b*) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

The operations to be discussed below relate to capturing images and detecting optically detectable markers in the captured images for the purpose of tracking an object with respect to one or more cameras.

A device such as an HMD or a handheld controller may have a surface upon which one or more optically detectable markers are disposed so that detection of the markers allows the device to be tracked. For example, a device such as an HMD can be provided which has one or more optically detectable markers, each optically detectable marker comprising a plurality of predetermined elements (e.g. electrically illuminable elements such as LEDs, or passive features such as coloured shapes or a logo or a combination thereof) arranged on a surface of the device. One or more cameras facing the device can be used to capture images of the optically detectable markers. Image analysis can be performed to detect a position of an optically detectable marker with respect to the position of each of the cameras to allow tracking of the device with respect to the cameras based on an analysis of successive images. Similarly, an HMD may comprise one or more cameras which can capture images of optically detectable markers disposed on another device such as a games console or a television. In this case, the images captured by the one or more cameras mounted on the HMD can be used to detect a position of an optically detectable marker with respect to the position of each of the cameras to allow tracking of the HMD.

Figure 12:
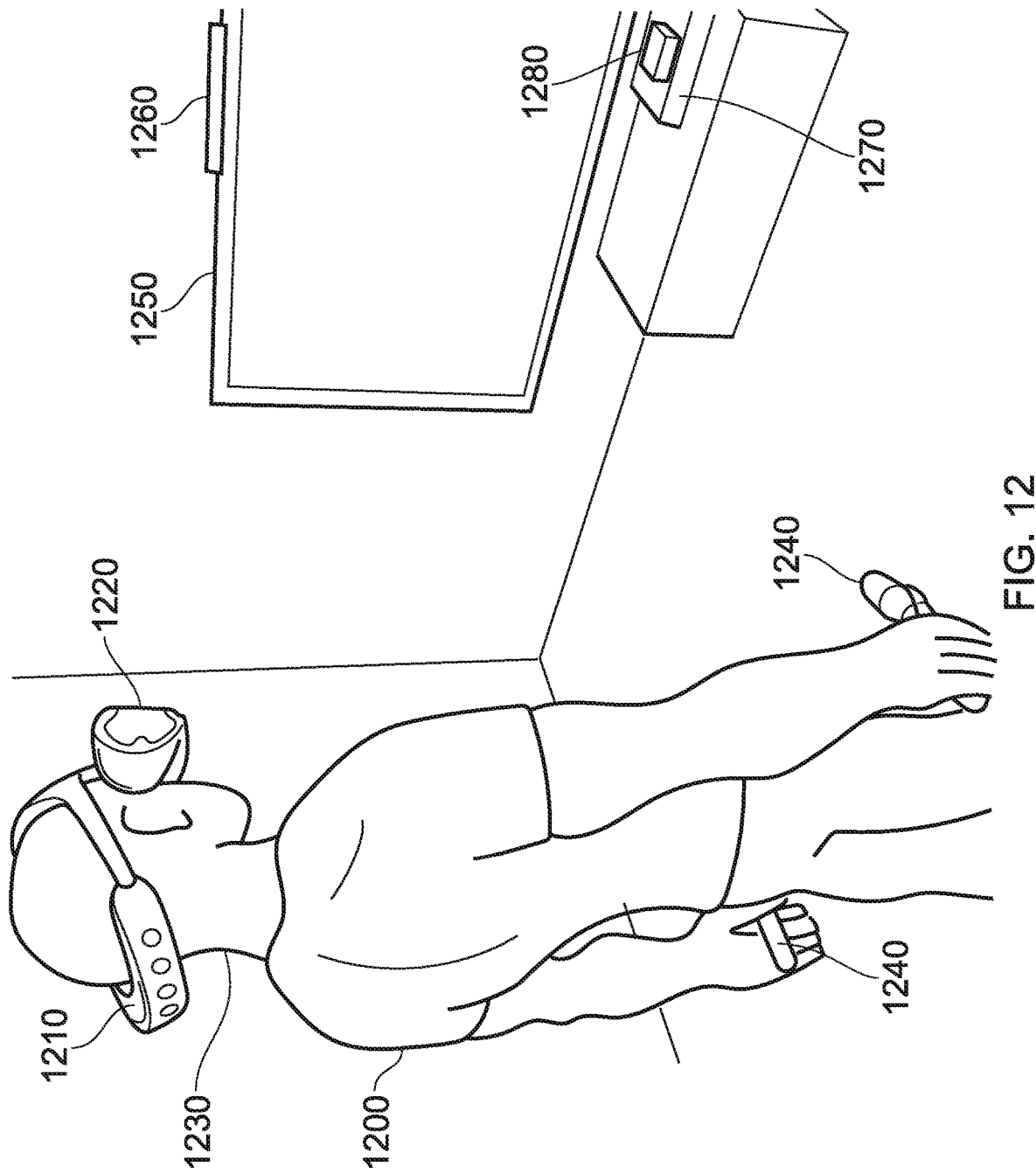
FIG. 12 schematically illustrates a user wearing an HMD and engaged in a video game.

FIG. 12 schematically illustrates a user wearing an HMD and engaged in a video game. In many respects, the arrangement of FIG. 12 is similar to that of FIG. 7 discussed above, but for clarity of the diagram the cabled connections 82, 84 and the optional break-out box 350 of FIG. 7 are not shown. However, FIG. 12 does illustrate an example of the relative positioning of the user and other components in normal operation.

In FIG. 12, the user 1200 is wearing an HMD 1210 having one or more optically detectable markers 1220 at the front of the HMD (where the term "front" is relative to an orientation of the user's head) and one or more optically detectable markers 1230 at the rear of the HMD, for example, on a head strap. The user carries a hand held controller 1240 in each hand (in this example). The user is facing a television screen 1250. Of course, it is recognised that when the user is wearing the HMD 1210, the user does not himself observe the television screen. However, facing the television screen provides a natural orientation to other components of the apparatus. The television screen may, as discussed above, provide a so-called "social screen" representing images indicative of game action being played by the user 1200, for the enjoyment of other nearby people who are not wearing HMDs.

Situated around the television screen are a light bar 1260, to be discussed below, a games console 1270 and at least one image capture unit 1280. The image capture unit 1280 may comprise one camera configured to capture successive images of the optically detectable markers 1220, 1230 on the HMD. Alternatively or in addition, the image capture unit 1280 may comprise a plurality of cameras arranged with respect to each other according to a predetermined configuration. In this case, knowledge of the predetermined configuration allows the coordinate system of one camera to be mapped with respect to a coordinate system of another camera so that the images captured by the respective cameras can be used together to track a single device.

In operation, one or more of the devices (namely the HMD 1210, the console 1270 and the hand-held controllers 1240) have at least one camera and using the camera, the devices detect the positions (or at least the relative positions) of other ones of the devices by means of detecting markers in captured images. To assist with this, the HMD comprises front and rear markers as discussed; the light bar 1260 can provide an optically detectable marker indicating a location of or relative to the television screen console, and the hand-held controllers 1240 can provide respective optically detectable markers. Other devices (for example, a second HMD worn by another user, and/or one or more other peripheral devices) can also detect the relative position of devices shown in FIG. 12 and also be detected by those devices. In some examples, the devices share the data defining the relative positions of other devices, as detected using the respective cameras, so that collectively, or via a master device such as the console 1270 handling the collection and amalgamation of the position data, a map or specification of the positions within the game playing area of each of the devices can be derived based on their respective relative position detections.

Figure 13:
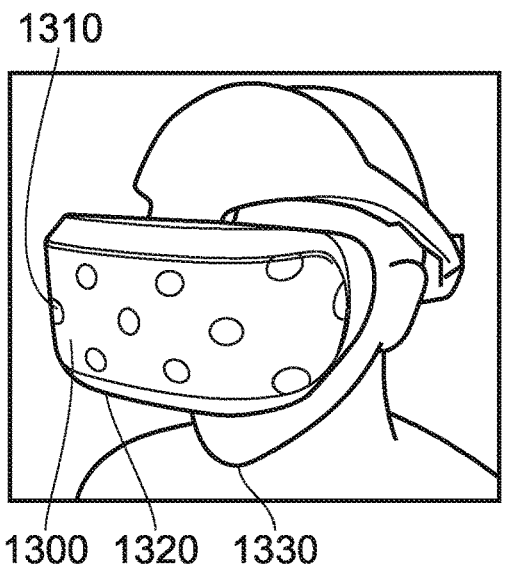
FIGS. 13 and 14 are respective front and rear schematic views of and HMD.

In FIG. 13, the front surface 1300 of the HMD worn by the user has one or more optically detectable markers, each optically detectable marker comprising a plurality of predetermined elements 1310 (LEDs or other light emitting portions, electrically illuminated portions, or passive features 1310) disposed on a surface of the HMD so that features of the optically detectable marker can be detected by one or more cameras, such as a camera provided as part of the image capture unit 1280, directed towards the HMD. The predetermined elements 1310 can collectively be considered as a single optically detectable marker. In some examples, the predetermined elements 1310 disposed on the front of the HMD may form a single optically detectable marker. Alternatively, the front of the HMD may comprise a plurality of optically detectable markers each comprising a plurality of predetermined elements.

A reason for having multiple predetermined elements is to assist in distinguishing the optically detectable marker from other image features in the captured images. Also, having multiple predetermined elements allows an estimation of the separation distance from the camera to the detected marker, in that the distance (in the captured images) between the predetermined elements 1310 will be smaller for a more distant HMD (with respect to the camera capturing the images) and larger for a closer HMD. In this way, the optically dateable marker comprises two or more spatially separated marker portions; and the detector is configured to detect respective image locations of images of the marker portions (predetermined elements) in the given captured image.

Figure 14:
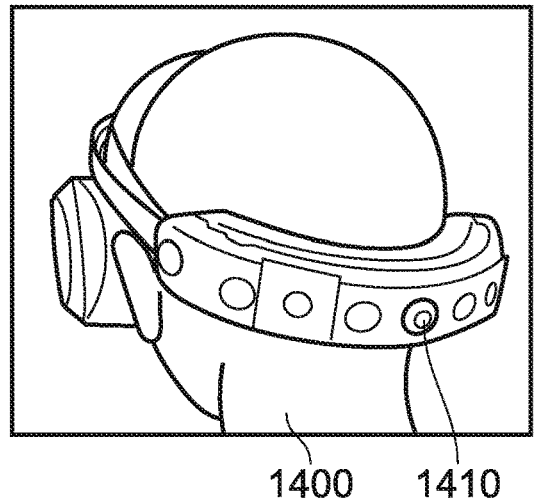

FIG. 14 schematically illustrates a rear view of the HMD in which a further optically detectable marker comprising a plurality of predetermined elements 1400 is provided. So, if the user turns his back on the console and its associated camera, or if other peripheral devices are disposed behind the user in use, the location of the HMD can still be optically detected using a camera.

Figure 15:
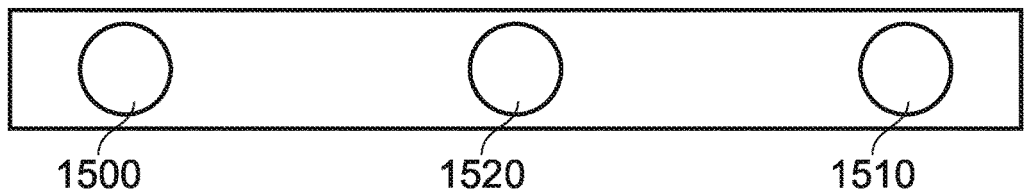
FIG. 15 schematically illustrates a light bar.

FIG. 15 schematically illustrates a light bar of the type shown in FIG. 12, having an optically detectable marker comprising predetermined elements 1500, 1510 (such as LEDs or other electrically illuminable elements). A further LED or indicator 1520 can be provided, for example to give timing information to the other devices in the system. By transmitting (for example) an encoded stream of optical pulses using the LED 1520, the optical position detections by other devices in the overall apparatus can be synchronised to a common time frame specified by the console. By positioning the LED 1520 between the marker portions 1500, 1510, its location can be inferred in a captured image even when the LED 1520 is not currently illuminated. So, a pattern of illumination and non-illumination can be detected for the LED 1520 by virtue of its location relative to the marker portions 1500, 1510. Therefore, in examples, an optically detectable indicator (the indicator 1520) comprises an electrically illuminable element such as a light emitting diode.

Figure 16:
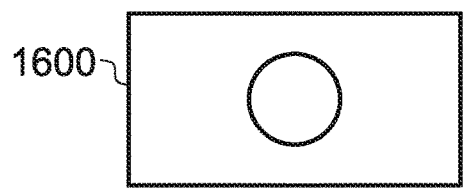
FIG. 16 schematically illustrates an image capture unit.

FIG. 16 schematically illustrates an image capture unit 1600 associated with the console and, as in the example of FIG. 12, may be positioned close to the position of the console. As discussed previously, the image capture unit 1600 may comprise one camera or may alternatively comprise a plurality of cameras arranged with respect to each other. In some examples, the image capture unit 1600 may comprise a stereoscopic camera so that depth information can be derived for an image feature, such as an optically detectable marker or an individual predetermined element 1310, based on a relative displacement (parallax information) of the feature included in a stereoscopic image.

Figure 17:
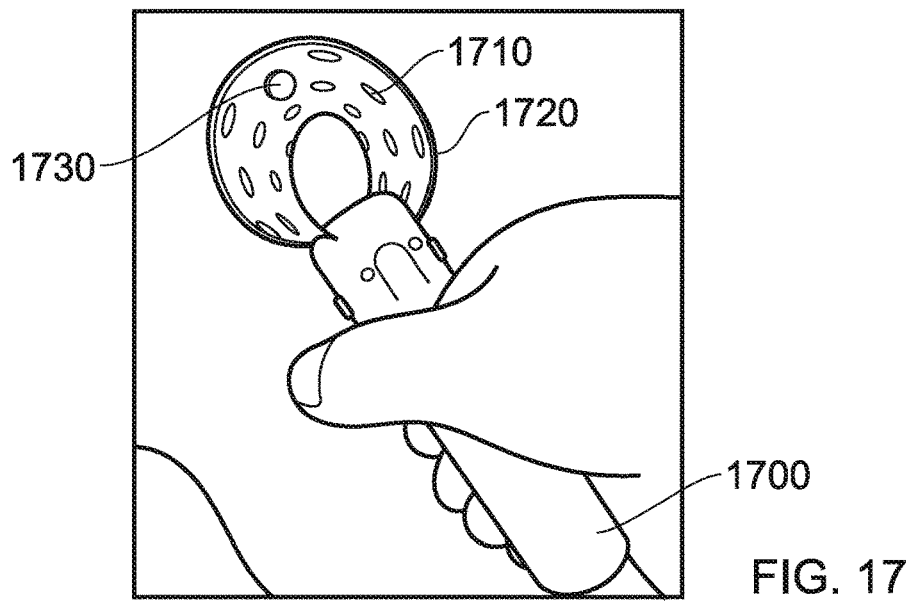
FIG. 17 schematically illustrates a hand-held controller.

FIG. 17 schematically illustrates a hand-held controller 1700 having an optically detectable marker 1710 formed of a plurality of predetermined elements 1720 disposed at its distal end. A camera 1730 may also be provided as part of the hand-held controller 1700.

So, each of the devices shown in FIG. 12 may provide an optically detectable marker having a plurality of predetermined elements and may also provide a camera. For the console, the camera is provided as part of the image capture unit 1600 of FIG. 16. For the hand-held controllers, the camera is provided as the camera 1730 of FIG. 17. For the HMD, because the orientation of the HMD can vary dramatically during use, multiple cameras may be provided, such as cameras 1320, 1330 facing forwards and a camera 1410 facing backwards.

FIG. 18a schematically illustrates a data processing apparatus 1800 for analysing images captured by a camera. In embodiments of the disclosure, the data processing apparatus 1800 comprises: an analyser 1810 to analyse successive images captured by a camera and to detect an optically detectable marker in the captured images; a first location detector 1820 to detect a location of the optically detectable marker with respect to a location of the camera according to a first detection mode and to generate a first detection result; a second location detector 1830 to detect the location of the optically detectable marker with respect to the location of the camera according to a second detection mode different to the first detection mode and to generate a second detection result; and a processor 1840 to select at least one of the first detection result and the second detection result and to generate data indicative of the location of the optically detectable marker with respect to the location of the camera based on the selection.

In this context, the data processing apparatus 1800 may be provided as part of: an HMD, a break-out box, a games console, a general purpose computing device, a peripheral device or the like. The data processing device 1800 can therefore be provided as part of a general purpose computing device or an HMD which receives image data from an individual camera. The data processing apparatus 1800 can be configured to detect a location of an optically detectable marker with respect to a location of a camera by analysing a captured image, generating both the first detection result and the second detection result for the image, and selecting at least one of the first and second detection results to generate data indicating the location of the marker relative to the camera. As such, for a given image, the first location detector 1820 and the second location detector 1830 detect a location of the optical marker in the image with respect to the camera that captured the image using two different detection principles (first detection mode and second detection mode). The first and second detection results generated by the first location detector 1820 and the second location detector 1830, respectively, can either be combined by the processor 1840 to generate the data indicative of the location of the optical marker with respect to the camera or one of the detection results may be selected for generating the data indicative of the location of the optical marker with respect to the camera.

In some cases, the data processing apparatus 1800 is configured to receive images from a plurality of respective cameras. For each image analysed by the data processing apparatus 1800, the data processing apparatus 1800 is configured to generate the first detection result and the second detection result to provide an indication of a position of an optical marker with respect to the camera that acquired that image. In this way, the data processing apparatus 1800 can receive successive images from multiple cameras each having a respective coordinate system and data indicative of the location of the marker with respect to each camera can be generated for each camera coordinate system.

The data processing apparatus 1800 can be configured to obtain data of successive images captured by one or more cameras. For example, the data processing apparatus 1800 may obtain image data from a camera via a wired (such as a USB) or wireless communication link (such as WiFi or Bluetooth®).

The analyser 1810 is arranged to analyse each image by extracting image features to detect a presence of an optically detectable marker in the image. Extracted image features can be compared with a model defining predetermined properties of one or more predefined optically detectable markers in order to perform marker recognition.

As discussed previously, each optically detectable marker may comprise a plurality of predetermined elements (e.g. electrically illuminable elements such as LEDs, or passive features such as coloured shapes or a logo or a combination thereof). Information regarding properties of an optically detectable marker or a predetermined element (e.g. shape, size, colour, relative positioning of predetermined elements) can be stored by the model. The analyser 1810 can be configured to detect one or more predetermined elements in an image based on a comparison of detected image features with information regarding a predetermined element or a predefined marker defined by the model.

The model may define properties of predetermined elements which can be compared with properties of extracted image features to detect whether a given predetermined element is present in the captured image. For example, in the case where the marker comprises predetermined elements having a circular shape, a degree of roundness may be used to detect whether an image feature corresponds to a predetermined element. In this way, the analyser 1810 can detect whether the image includes one or more predetermined elements such as a light emitting diode, a coloured shape, or a logo. The model may also define properties of one or more predefined optically detectable markers such as a predefined geometric arrangement of the respective predetermined elements forming the marker, such that the analyser 1810 can detect whether the image includes one or more predetermined elements in the image that correspond to the predefined marker defined by the model.

In a simplest case, detection of a presence of one or more LEDs or predetermined shapes in the captured image can be used by the analyser 1810 to detect that a marker is included in the image. In other words, the presence of a single predetermined element of an optically detectable marker defined by the model can be detected by the analyser 1810 to detect the presence of the marker in the image. The model may comprise information indicative of a geometric structure of an optically detectable marker by providing information such as the relative positions of the respective predetermined elements forming the marker. For example, the model may comprise information indicative of the relative positions of each predetermined element 1310 forming the marker illustrated in FIG. 13. In addition to the relative position of each predetermined element 1310 forming the marker, the model may comprise information indicative of a shape and/or a colour of each predetermined element 1310. In this way, features extracted from a captured image can be compared with the predefined properties of an optically detectable marker defined by the model to detect whether an optically detectable marker defined by the model is present in the captured image.

In some examples, an HMD may have a first optical marker such that the predetermined elements have a first relative positioning with respect to each other, and a handheld controller may have a second of optical marker having a second relative positioning of the predetermined elements, so that the different optical markers can be used to distinguish between the two types of device. Alternatively or in addition, a first HMD and a second HMD may each have an optical marker having a different configuration for the predetermined elements, such that the respective HMDs can be distinguished based on the different configurations of the predetermined elements forming the markers. In other words, a marker associated with a first type of device may have a plurality of predetermined elements arranged in a first predetermined pattern and another marker associated with a second type of device may have a plurality of predetermined elements arranged in a second predetermined pattern and recognition of the pattern in an image can be used to detect which marker is included in the image. The analyser 1810 can be configured to detect whether a pattern of the predetermined elements in a captured image corresponds to the first predetermined pattern or the second predetermined pattern to detect whether the marker associated with the first type of device or the second type of device is present in the image.

Alternatively or in addition, one device may have a marker comprising predetermined elements having a first colour whereas another device may have a marker comprising predetermined elements having a second colour such that, even when the respective markers have the same geometric arrangement, the colours of the predetermined elements forming the markers can be used to distinguish between the two devices.

Alternatively or in addition, each optically detectable marker may comprise a plurality of predetermined elements, where each predetermined element has a predetermined shape. For example, each predetermined element may have a predetermined shape such that one marker comprises predetermined elements having a first predetermined shape (e.g. each predetermined element has a square shape) and another marker comprises predetermined elements having a second predetermined shape (e.g. each predetermined element has a circular shape). Various combinations of the different shapes for the predetermined elements may be used to form a single optically detectable marker, and the combination of the shapes of the predetermined elements can be used to distinguish one marker from another marker.

In this way, a first type of optical marker may be distinguished from a second type of optical marker based on one or more from the list consisting of: a relative positioning of the respective predetermined elements (geometric pattern associated with the optical marker); a colour of one or more of the respective predetermined elements; and a shape of one or more of the predetermined elements. In the case where the optical marker comprises predetermined elements each comprising an electrically illuminable element (such as an LED), then each predetermined element may be controlled to emit light according to a predetermined sequence so that the emitted light transitions from one colour to another colour and this information can also be used to aid marker recognition using the model.

Therefore, the analyser 1810 can be configured to analyse an image including an optically detectable marker and to detect properties of the optically detectable marker. The properties of an optically dateable marker are used by the first location detector 1820 and the second location detector 1830 to detect the location of the marker with respect to the location of the camera. The first location detector 1820 uses a first detection principle to detect a camera-marker separation distance using the result of the analysis performed by the analyser 1810. The second location detector 1830 uses a second detection principle different to the first detection principle to detect a camera-marker separation distance using the result of the analysis performed by the analyser 1810. Using information indicating a 2D position of the marker in the captured image and the camera-marker separations distances obtained using the two detection principles, data indicative of the location of the marker with respect to the camera can be generated.

The first location detector 1820 is arranged to detect a location of the optically detectable marker based on the properties of the marker detected by the analyser 1810. Using a first detection mode, to be discussed in more detail later, the first location detector 1820 detects the location of the optical marker with respect to the coordinate system of the camera used to capture the image of the marker and generates a first detection result indicative of the location of the optical marker with respect to the camera. Properties extracted from an image by the analyser 1810 may include relative positions of the respective predetermined elements forming the marker in the captured image. Information indicative of the relative positions of the respective predetermined elements can thus be obtained by the first location detector 1820 and used to detect a distance of the marker from the camera based on the size of the marker in the captured image. The combination of the detection of a 2D position of a marker in the captured image and the detected relative positions of the respective predetermined elements can therefore allow the 3D location of the marker to be derived with respect to a camera coordinate system.

Similarly, the second location detector 1830 is arranged to detect the location of the optically detectable marker based on the properties of the marker detected by the analyser 1810. However, whereas the first location detector 1820 uses a first detection mode (first detection principle) to detect a marker's location relative to a camera, the second location detector 1830 uses a second detection mode (second detection principle) different to the first detection mode to detect the marker's location relative to the camera. Properties extracted from an image by the analyser 1810 may include the shape of a respective predetermined element included in the captured image. Information indicative of the shape of one or more respective predetermined elements can be obtained by the second location detector 1820 and used for comparison with a predefined shape defined by the model to detect a distance of the predetermined element, and thus the marker, from the camera. The second location detector 1830 thus generates a second detection result indicative of the location of the optical marker with respect to the camera by using the second detection mode (second detection principle).

Therefore, using the same image the first location detector 1820 and the second location detector 1830 can each detect a location of the optical marker (in the image) with respect to the camera using two different detection principles. The two different techniques allow two detection results to be generated for the same marker in the same image, and the processor 1840 selects at least one of the detection results in order to generate the data that is indicative of a 3D location of the marker with respect to the camera. The first detection result and the second detection result can both be supplied to the processor 1840 and the processor 1840 can then select at least one of the detection results for generating the data.

FIG. 18b schematically illustrates the data processing apparatus 1800 for analysing images captured by an image capture unit 1850 provided as part of the data processing apparatus 1800. In embodiments of the disclosure the data processing apparatus 1800 comprises: the analyser 1810; the first location detector 1820; the second location detector 1830; the processor 1840; and the image capture unit 1850. The image capture unit 1850 is configured to capture the successive images to be analysed by the analyser 1810. The image capture unit 1850 may comprise at least one camera configured to capture successive images and image data indicative of the images captured by the camera can be provided to the analyser 1810.

In embodiments of the disclosure, the image capture unit 1850 comprises a plurality of cameras arranged according to a predetermined configuration, each camera having a coordinate system, and wherein a mapping between the coordinate systems for the cameras is dependent upon the predetermined configuration. The image capture unit 1850 may comprise a plurality of cameras, where each camera is configured to capture successive images and image data indicative of the images captured by each camera can be provided to the analyser 1810. Images captured by respective cameras each having a position and an orientation can be analysed by the data processing apparatus 1800. Data indicative of a location of a given marker with respect to a first camera can be generated, and data indicative of a location of the given marker with respect to a second camera can also be generated. Therefore, data generated using images captured by the two or more cameras can be combined by mapping the coordinate systems for each camera using the camera transform that is known due to the predetermined configuration of the cameras. In this way, the location of the marker with respect to the first camera and the location of the marker with respect to the second camera may be combined according to a triangulation using the camera coordinate systems of the first and second cameras.

For example, for the case where a given marker is included in images captured by two respective cameras, camera A and camera B, the data processing apparatus 1800 is configured to analyse the images captured by camera A to generate the first and second detection results and to generate the data indicative of the location of the maker with respect to camera A based on at least one of the first and second detection results. In addition, the data processing apparatus 1800 is configured to analyse the images captured by camera B to generate the first and second detection results and to generate the data indicative of the location of the maker with respect to camera B based on at least one of the first and second detection results. Therefore, the data processing apparatus 1800 can generate data indicating the location of the marker with respect to the camera coordinate system for camera A and can also generate data indicating the location of the marker with respect to the camera coordinate system for camera B. For the case where the camera A and camera B are arranged according to the predetermined configuration, the mapping between the respective coordinate systems is thus known and a position with respect to the camera coordinate system for camera A can be mapped to a position with respect to the camera coordinate system for camera B and vice versa. Therefore, the mapping between the camera coordinate systems of the respective cameras can be used to map a location with respect to camera A to a location with respect to camera B. For example, the respective cameras may be arranged according to the predetermined configuration so that the cameras are positioned side-by-side, separated by a predetermined distance and facing in the same direction such that the position and orientation of one camera with respect to another camera is known and a transformation function for the camera coordinate systems is known. An example of such a predetermined configuration is the camera configuration used by the Sony® PlayStation VR® camera. It will be appreciated that other predetermined configurations for the plurality of cameras are considered by the present disclosure.

Therefore, for the case where the same marker is included in images captured by both camera A and camera B, the data generated by the processor 1840 for the images captured by camera A can be compared with the data generated by the processor 1840 for the images captured by camera B to check for agreement between the location of a given marker. The images captured by one camera can therefore be correlated with images captured by another camera using the mapping between the camera coordinate systems. When only a portion of a marker is observed in images captured by a camera located close to the marker, images captured by another camera located further away from the marker may also be used to detect the marker and provide confirmation of which portion of the marker is included in the images captured by the camera located close to the marker. In this way, a specific portion of a marker included in an image, such as an individual LED for example, can be identified and tracked by a camera even when the entirety of the marker is not included in the image. The processor 1840 can therefore generate data indicative of a location of a marker with respect to a camera on the basis of a portion of a marker included in an image, as discussed in further detail below.

In embodiments of the disclosure the optically detectable marker comprises a plurality of predetermined elements positioned relative to each other to define a size of the optically detectable marker. The predetermined elements forming a marker may comprise one or more from the list consisting of: an electrically illuminable element; and a passive feature such as coloured shape or a logo. The optically detectable marker may comprise any number of predetermined elements arranged with respect to each other according to a predefined configuration. For example, the predetermined elements may be arranged in a predefined configuration such as that illustrated in FIG. 13, so that the marker has a predefined size according to the separation distance between the predetermined elements, and information regarding the predefined geometric arrangement can be stored and used for comparison with image data for detecting the marker in a captured image. The analyser 1810 can be configured to extract image features in a captured image, including a shape of a predetermined element and a distance between one predetermined element and another predetermined element. These properties can be used by the analyser 1810 to detect the presence of a marker in an image either when the entirety of the marker is included in the image or a portion of the marker is included in the image.

In embodiments of the disclosure, the optically detectable marker comprises a plurality of light emitting diodes. In some examples, the light emitting diodes is controlled according to a predefined illumination sequence to adjust the intensity and/or colour of each light emitting diode so as to distinguish between light emitting diodes. In this way, for a light emitting diode included in an image, a transition of the colour and/or intensity of the emitted light according to a predefined sequence may allow the analyser 1810 to distinguish the respective light emitting diodes when the entirety of the marker is not included in the image. For example, one light emitting diode of the marker may be controlled to transition from red to green to blue, whereas another light emitting diode of the marker may be controlled to transition from blue to yellow to green. By detecting the transition of a given light emitting diode the analyser 1810 can distinguish between the light emitting diodes in the captured image and detect which light emitting diode of the marker is included in the image to thus detect which portion of the marker is included in the image.

First Detection Mode

The first location detector 1820 is configured to detect the location of the optically detectable marker with respect to the location of the camera according to the first detection mode and to generate the first detection result. In embodiments of the disclosure the first location detector 1820 is configured to detect the location according to the first detection mode based on a size of the optically detectable marker in the captured images.

As discussed previously, the marker comprises a plurality of predetermined elements arranged with respect to each other such that the marker has a predefined size. The analyser 1810 can detect a marker in a captured image and information regarding the positions of the predetermined elements forming the marker can be used by the first location detector 1820 to detect the distance of the marker from the camera based on the size of the marker in the image relative to the predefined size of the marker. The first detection result generated in accordance with the first detection mode thus provides an indication of the location of the marker with respect to the camera based on a relationship between a geometric size of the marker in the captured image and a predefined geometric size of the marker.

The size of the marker in the captured image will vary depending on the distance between the camera and the marker. FIG. 19 schematically illustrates two images 1910, 1920 including the same marker 1950 where the distance from the marker to the position of the camera is different for the two images. In the image 1910 the marker 1950 is located closer to the camera (e.g. less than 2 metres from the camera), whereas in the image 1920 the marker 1950 is located further away from the camera (e.g. more than 5 metres from the camera). When located far away from the camera, the marker 1950 appears smaller in size in the captured image, and when the marker 1950 is located closer to the camera the marker appears larger in size in the captured image. Therefore, by detecting properties of the marker 1950 in the image and comparing the size of the marker 1950 with a predefined size of the marker 1950, the distance of the marker with respect to the camera can be detected. In this way, the 2D position of the marker in the captured image and the size of the marker relative to the predefined size of the marker (actual size of the marker) can be used to detect the location of the marker with respect to the camera.

In embodiments of the disclosure, the first location detector 1820 is configured to detect a distance between respective predetermined elements of the optically detectable marker in the captured images, to compare the distance with a predefined model of the optically detectable marker and to generate the first detection result indicative of the location of the optically detectable marker with respect to the location of the camera. In a simplest case, the marker may comprise two predetermined elements 1951, 1952 which are separated by a distance of X cm (e.g. 5 cm). For example, the marker may be disposed on a surface of an HMD or a handheld controller, as illustrated in FIG. 12. When the user wearing the HMD comprising the marker 1950 moves with respect to the camera, the size of the marker 1950 in the captured image varies and the size of the marker 1950 can be compared with the predefined size of the marker defined by the model to determine how far away the HMD is located from the camera. In the image 1910 where the marker is located close to the camera, the separation distance Y between the predetermined elements 1951, 1952 can be detected. In the image 1920 where the marker is located far away from the camera, the separation distance Z between the predetermined elements can be detected. By comparing the magnitude of the separation distance between the predetermined elements in the captured images (distances Y and Z) with the magnitude of the predefined size of the marker (X), the distance of the marker with respect to the camera position can be detected.

It will be appreciated that the marker 1950 may be oriented with respect to the camera differently to that shown in FIG. 19, such that the separation distances between the predetermined elements may change depending on the orientation of the marker 1950 with respect to the camera. The first location detector 1820 can be configured to detect the orientation of the marker 1950 in the image with respect to the camera based on a comparison of the geometric properties of the marker in the image with the predefined geometric properties of the marker defined by the model. For example, for the case where the marker 1950 in the image 1910 is disposed on a surface of an HMD and the user tilts their head upwards, the separation distance Y between the predetermined elements 1951 and 1952 will be less than that illustrated in the image 1910. Similarly, for the case where the user tilts their head to the left or the right, the separation distance Y between the predetermined elements 1951 and 1952 may remain substantially the same, whereas the separation distance between the predetermined element 1951 and the other predetermined elements in the image 1910 will change and the separation distance between the predetermined element 1952 and the other predetermined elements in the image 1910 will also change. Therefore, the separation distance between the predetermined elements forming the marker may also change as a function of the orientation of the marker with respect to the camera. The first location detector 1820 can therefore detect the orientation of the marker 1950 with respect to the camera based on the shape of the marker in the image compared to the predefined shape of the marker by detecting separation distances between the predetermined elements and comparing the separation distances with the geometric properties of the predetermined elements defined by the model.

As such, changes in the separation distance Y between the predetermined elements 1951 and 1952 which occur due to changes in orientation can be detected by the first location detector 1820, and changes in the separation distance Y which occur due to changes in camera-marker separation distances can also be detected by the first location detector 1820. The first location detector 1820 can therefore detect the position and the orientation of the marker 1950 with respect to the camera by detecting distances between respective predetermined elements of the optically detectable marker.

It will be appreciated that the analyser 1810 can be configured to detect respective predetermined elements included in a captured image and the first location detector 1820 can be configured to detect a distance between any of the respective predetermined elements forming the marker. For example, the first location detector 1820 can detect a distance between the predetermined element 1951 and each of the other predetermined elements forming the marker and any of these distances can be compared with one or more predefined distances defined by the model. Therefore, when the entirety of the marker is included in the field of view of the camera any of the predetermined elements can be used for detecting the size of the marker.

When the marker 1950 is located far away from the camera, such as when a user wearing an HMD comprising the marker is stood in-front of a camera and several metres away from the camera, the entirety of the marker (all of the predetermined elements forming the marker) may be included in the captured image. In this case, the first detection method provides a reliable technique for detecting the location of the marker by detecting a size of the marker based on positions of respective predetermined elements in the captured image. As the marker approaches the camera (camera-marker separation distance decreases), the size of the marker in the captured image increases and eventually some of the predetermined elements are not included in the camera's field of view. In this case, the first detection method can be performed by the first location detector 1820 using a smaller number of predetermined elements to generate the first detection result.

However, since the number of predetermined elements used for the calculation is reduced, the reliability of the first detection method for detecting the location of the marker 1950 is adversely affected. Therefore, as the separation distance between the camera and the marker decreases further and the number of predetermined elements in the captured image also decreases further, the first detection method becomes less reliable. It will be appreciated that provided that at least two predetermined elements are included in the captured image, the first detection method may be used to generate the first detection result based on a comparison of the separation distance between the two predetermined elements with respect to the corresponding separation distance defined by the model, however the first detection result is less reliable compared to the case when the entirety of the marker is included in the captured image.

Second Detection Mode

The second location detector 1830 is configured to detect the location of the optically detectable marker with respect to the location of the camera according to the second detection mode, which is different to the first detection mode, and to generate the second detection result. In embodiments of the disclosure the second location detector 1830 is configured to detect the location of the optically detectable marker with respect to the location of the camera according to the second detection mode based on a shape of a respective predetermined element of the optically detectable marker in the captured images.

As discussed previously, the analyser 1810 can detect properties of respective predetermined elements included in a captured image. For example, in the case where the marker comprises a plurality of circular LEDs and/or a plurality of circular passive features, a factor of roundness algorithm may be used by the analyser 1810 to detect predetermined elements in the captured image. By detecting groups of connected pixels sharing a common property (e.g. similar grayscale value), "blobs" of pixels can be detected in the image and analysed with respect to a factor of roundness (other shapes may be considered depending on the shapes of the predetermined elements) to detect whether there is a correspondence between the shape of the "blob" of pixels and a shape of a predetermined element defined by the model.

In embodiments of the disclosure, the second location detector 1830 is configured to detect the shape of at least one predetermined element in the captured images, to compare the shape with a predefined model of the optically detectable marker and to generate the second detection result indicative of the location of the optically detectable marker with respect to the location of the camera. The presence of one or more predetermined elements in the image can be detected by the analyser 1810 and information regarding the shape of detected "blobs" of pixels can be used by the second location detector 1830 for comparison with the geometric properties of an individual predetermined element defined by the predefined model. By comparing the detected shape of the predetermined element in the captured image with the shape of the predetermined element defined by the model, the orientation and position of the predetermined element with respect to the camera can be derived. Therefore based on the 2D position of the predetermined element in the captured image and the comparison of the detected shape of the predetermined element with the predefined model of the optically detectable marker, a 3D location of the predetermined element with respect to the camera can be derived.

For example, for a predetermined element having a substantially circular shape, the shape (dimensions) of the predetermined element in the captured image will be substantially circular when oriented towards the camera, whereas the shape of the predetermined element in the captured image will be more elliptical when oriented away from the camera. In addition, the dimensions of the predetermined element will vary in dependence upon the distance of the predetermined element from the camera. Therefore, using the properties of the shape of a predetermined element obtained by the analyser 1810, the second location detector 1820 can compare the properties with the predefined model and generate data indicative of the location of the optically detectable marker with respect to the location of the camera. For the case where a plurality of predetermined elements are included in the image, this technique can be performed for each predetermined element in the image to generate the second detection result according to the second detection mode.

When the marker is located close to the camera, such as when a user wearing an HMD comprising the marker is stood in-front of a camera and within less than 1 metre of the camera, only certain predetermined elements of the marker may be included in the captured image. However, since the respective predetermined elements are located close to the camera, the dimensions of an individual predetermined element, such as the shape and the size of each predetermined element, can be more reliably detected. As such, the reliability of the second detection result generated according to the second detection mode improves as the distance between the marker and the camera is decreased because dimensional properties of respective predetermined elements can be more reliably detected.

Mode Selection

The second detection mode may provide a detection result for which the reliability improves as the distance between the camera and the marker decreases, since the properties of an individual predetermined element can be more reliably detected. Conversely, the first detection mode may provide a detection result for which the reliability worsens as the distance between the camera and the marker decreases because the extent of the marker, and thus the number of predetermined elements, included in the image decreases as the distance between the camera and the marker decreases.

For each image acquired by the data processing apparatus 1800, the image analyser 1810 is configured to detect an optically detectable marker based on a comparison of extracted image features with properties of a model defining one or more predefined optically detectable markers each comprising a plurality of predetermined elements. Once the marker has been detected by the analyser 1810, the properties of the marker are processed in accordance with the first detection mode by the first location detector 1820 and processed in accordance with the second detection mode by the second location detector 1820 so as to generate two detection results indicating the 3D location of the marker with respect to the camera. Since the two detection modes are preformed using different properties associated with a given marker, it is possible that the detection results produced by the two detection modes may differ from each other. Specifically, the reliability of the two detection results may vary in dependence upon the distance of the marker from the camera.

The processor 1840 is configured to select at least one of the first detection result and the second detection result and to generate data indicative of the location of the optically detectable marker with respect to the location of the camera based on the selection. In embodiments of the disclosure, the processor 1840 is configured to select at least one of the first detection result and the second detection result based on a distance between the camera and the optically detectable marker. The distance between the camera and the optically detectable marker indicated by the first detection result and/or the distance between the camera and the optically detectable marker indicated by the second detection result can be used by the processor 1840 to determine whether to: select just the first detection result, select just the second detection result, or select both the first and second detection results. The processor 1840 can be configured to perform the selection based on a magnitude of the distance indicated by at least one of the first detection result and the second detection result.

Figure 20:
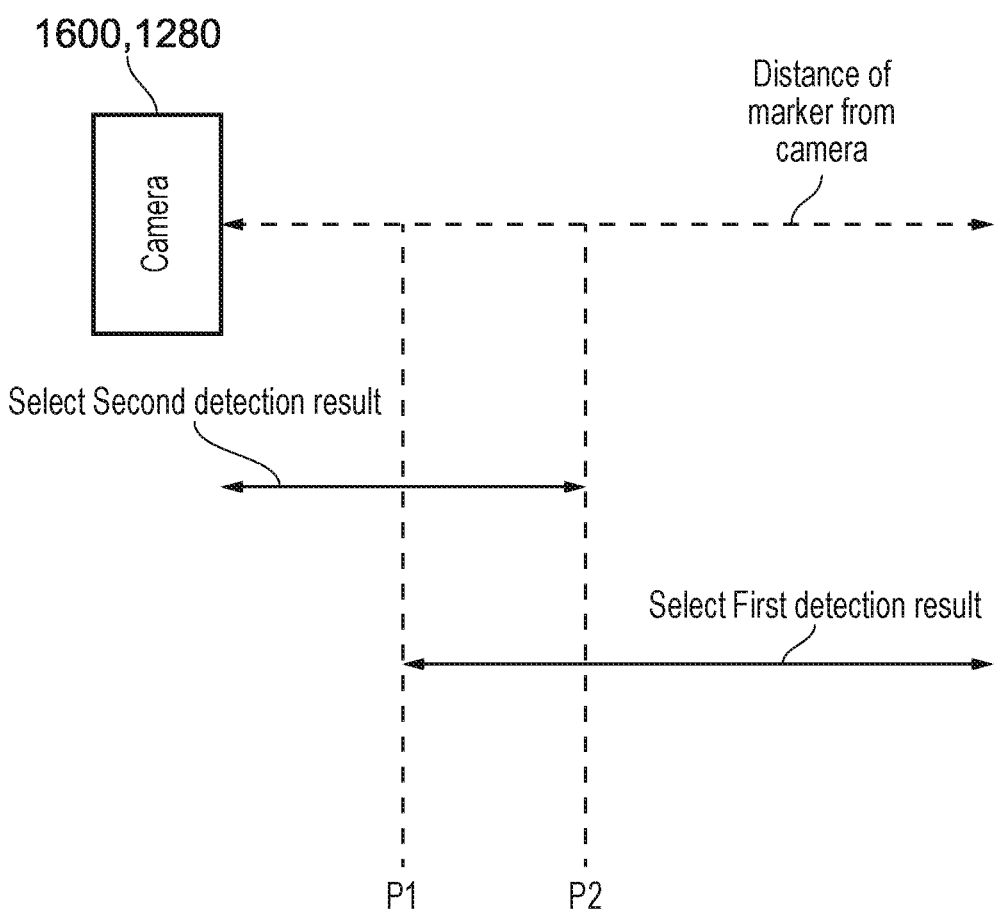
FIG. 20 schematically illustrates selecting detection results based on a distance between a marker and a camera.

FIG. 20 schematically illustrates selecting at least one of the first detection result and the second detection result based on a distance between a camera 1280, 1600 and an optically detectable marker. In embodiments of the disclosure, the first detection result is selected when the distance between the camera and the optically detectable marker is greater than a first predetermined threshold distance (P1). The distance compared with the first predetermined threshold distance (P1) may be the camera-marker separation distance indicated by the first detection result or may be the camera-marker separation distance indicated by the second detection result or both. In some examples, the distance indicated by the first detection result and the distance indicated by the second detection result are averaged, and the average distance is compared with the first predetermined threshold distance (P1) to make a determination as to whether to select the first detection result. Alternatively, the magnitude of the distance indicated by the first detection result may be compared with the first predetermined threshold distance (P1) and the magnitude of the distance indicated by the second detection result may also be compared with the first predetermined threshold distance (P1) and only when both distances are greater than the first predetermined threshold distance (P1) is the first detection result selected by the processor 1840.

As discussed previously, the first detection result may be less reliable than the second detection result for cases where the distance between the camera and the marker is relatively small (e.g. less than 1 metre). As such, for the case where the second detection result indicates a value for the camera-marker separation distance that is less than the first predetermined threshold distance (P1), only the distance indicated by the second detection result may be compared with the first predetermined threshold distance (P1) to provide a more reliable determination of whether to select the first detection result.

The value of the first predetermined threshold distance (P1) can be set in dependence upon the properties of the camera and/or the properties of the optically detectable marker. For example, the value of the first predetermined threshold distance (P1) may be set in dependence upon the size of the optically detectable marker and/or the spatial proximity of the respective predetermined elements forming the optically detectable marker. This is because the distance from the camera at which one or more of the predetermined elements forming the optically detectable marker fall outside the field of view of the camera is dependent upon the size of the optically detectable marker. In other words, for a marker having a larger size (having predetermined elements with a larger separation distance) one or more of the predetermined elements will fall outside the field of view of the camera at a distance X from camera, whereas for a marker having a smaller size it is possible for the entirety of the marker to be included in the image when the camera is at the distance X from the camera. Therefore, the value of the first predetermined threshold distance (P1) may be set so that an optically detectable marker having a given size has a given value for the first predetermined threshold distance (P1) and another optically detectable marker having a different size has a different value for the first predetermined threshold distance (P1).

Alternatively or in addition the value of the first predetermined threshold distance (P1) may be set in dependence upon an angle associated with a field of view of the camera. In this way, the value of the first predetermined threshold distance (P1) can be increased for a camera with a larger angular field of view, and the value of the first predetermined threshold distance (P1) can be decreased for a camera with a larger angular field of view.

As such, the value of the first predetermined threshold distance (P1) is set in a manner such that for camera-marker separation distances at which the first detection mode produces an unreliable detection result the first detection result is not selected by the processor 1840. In some examples, the first predetermined threshold distance (P1) may be set to have a value in the range 0.5 to 1.5 metres.

In embodiments of the disclosure, the second detection result is selected when the distance between the camera and the optically detectable marker is less than a second predetermined threshold distance (P2). The distance compared with the second predetermined threshold distance (P2) may be the camera-marker separation distance indicated by the first detection result or may be the camera-marker separation distance indicated by the second detection result or both. In some examples, the distance indicated by the first detection result and the distance indicated by the second detection result are averaged, and the average distance is compared with the second predetermined threshold distance (P2) to make a determination as to whether to select the second detection result. Alternatively, the magnitude of the distance indicated by the first detection result may be compared with the second predetermined threshold distance (P2) and the magnitude of the distance indicated by the second detection result may also be compared with the second predetermined threshold distance (P2) and only when both distances are less than the second predetermined threshold distance (P2) is the second detection result selected by the processor 1840.

As discussed previously, the reliability of the first detection result and the second detection result may vary depending on the distance between the camera and the marker. The first detection result may be more reliable than the second detection result for cases where the distance between the camera and the marker is relatively large (e.g. more than 3 metres). As such, for the case where the first detection result indicates a value for the camera-marker separation distance that is greater than the second predetermined threshold distance (P2), only the distance indicated by the first detection result may be compared with the second predetermined threshold distance (P2) to provide a more reliable determination of whether to select the second detection result.

The value of the second predetermined threshold distance (P2) can be set in dependence upon the properties of the camera and/or the properties of the optically detectable marker. For example, the value of the second predetermined threshold distance (P2) may be set in dependence upon the size of one or more of the predetermined elements forming the optically detectable marker. In some examples, the value of the second predetermined threshold distance (P2) is set in dependence upon the size of the smallest predetermined element forming the optically detectable marker. This is because for a larger sized predetermined element (larger sized LED or larger sized passive shape) the distance from the camera at which the dimensions associated with the shape of the predetermined element can be resolved by the camera is increased. In some examples, the second predetermined threshold distance (P2) can be set to have a value in the range 2 to 4 metres.

As such, the value of the second predetermined threshold distance (P2) is set in a manner such that for camera-marker separation distances at which the second detection mode produces an unreliable detection result, the second detection result is not selected by the processor 1840.

In embodiments of the disclosure a magnitude of a distance associated with the first predetermined threshold distance is less than a magnitude of a distance associated with the second predetermined threshold distance.

In embodiments of the disclosure, both the first detection result and the second detection result are selected when the distance between the camera and the optically detectable marker is greater than the first predetermined threshold distance (P1) and less than a second predetermined threshold distance (P2). For the case where the first detection result and the second detection result both indicate a value for the distance that is greater than the first predetermined threshold distance (P1) and less than the second predetermined threshold distance (P2), the two distances indicated by the two detection results are averaged and the average distance is compared with the first predetermined threshold distance (P1) and the second predetermined threshold distance (P2).

In embodiments of the disclosure, when both the first detection result and the second detection result are selected, the processor is configured to generate the data indicative of the location of the optically detectable marker by combining the first detection result and the second detection result to generate the data indicative of the location of the optically detectable marker with respect to the location of the camera. Therefore, the values of the first predetermined threshold distance (P1) and the second predetermined threshold distance (P2) are set in a manner such that for camera-marker separation distances at which the first and second detection modes both produce reliable detection results, both the first and second detection results are selected by the processor 1840 to generate the data indicative of the location of the optically detectable marker with respect to the location of the camera.

Figure 21:
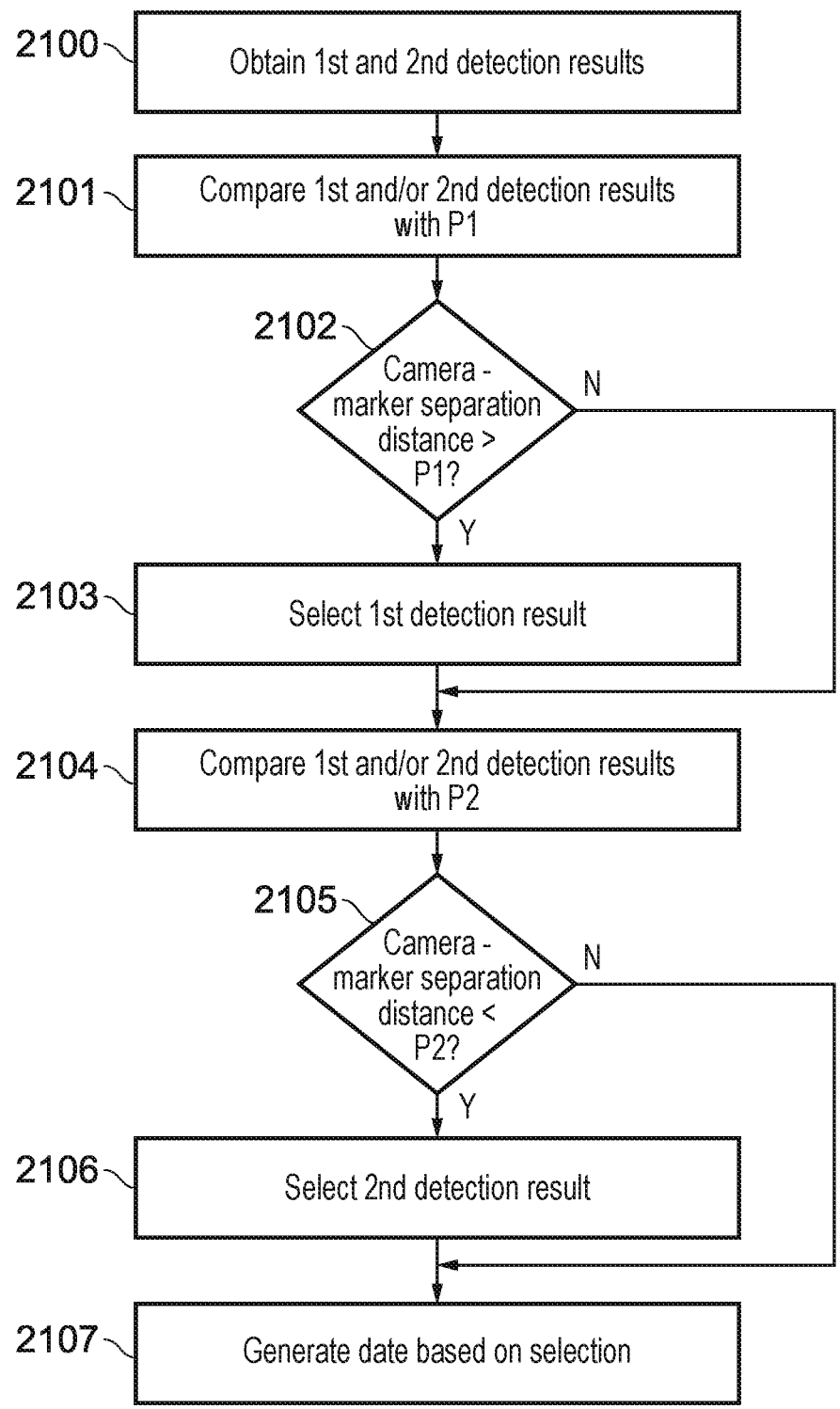
FIG. 21 is a schematic flowchart illustrating selecting a first detection result and/or a second detection result.

FIG. 21 is a schematic flowchart illustrating selecting the first detection result and/or the second detection result. The processor 1840 is configured to perform processing in accordance with the steps illustrated in FIG. 21 to select first detection result and/or the second detection result. At a step 2100, the processor 1840 obtains the first detection result and the second detection result generated by the first location detector 1820 and the second location detector 1830, respectively. At a step 2101, the processor 1840 compares at least one of the first and second detection results with the first predetermined threshold camera-marker separation distance (P1). As discussed previously, there are a number of possibilities for comparing at least one of the first and second detection results with the first predetermined threshold camera-marker separation distance (P1). At a step 2102, the processor determines whether the camera-marker separation distance is greater than the first predetermined threshold camera-marker separation distance (P1). When it is determined at the step 2102 that the camera-marker separation distance is greater than the first predetermined threshold camera-marker separation distance (P1), the flow proceeds to a step 2103. At the step 2103, the processor selects the first detection result so that at least the first detection result is used for generating the data indicating the location of the marker with respect to the camera. When it is determined at the step 2102 that the camera-marker separation distance is not greater than the first predetermined threshold camera-marker separation distance (P1), the flow proceeds to a step 2104 so that the first detection result is not selected.

At the step 2104, the processor compares at least one of the first and second detection results with the second predetermined threshold camera-marker separation distance (P2). As discussed previously, there are a number of possibilities for comparing at least one of the first and second detection results with the second predetermined threshold camera-marker separation distance (P2). At a step 2105, the processor determines whether the camera-marker separation distance is less than the second predetermined threshold camera-marker separation distance (P2). When it is determined at the step 2105 that the camera-marker separation distance is less than the second predetermined threshold camera-marker separation distance (P2), the flow proceeds to a step 2106. At the step 2106, the processor selects the second detection result so that at least the second detection result is used for generating the data indicating the location of the marker with respect to the camera. When it is determined at the step 2105 that the camera-marker separation distance is not less than the second predetermined threshold camera-marker separation distance (P2), the flow proceeds to a step 2107 so that the second detection result is not selected.

At the step 2107, the processor generates the data indicating the location of the marker with respect to the location of the camera using the selected detection results. Therefore, the data is generated by the processor in dependence upon whether the first detection result is selected at the step 2013 and whether the second detection result is selected at the step 2106. Therefore, the data generated at the step 2107 comprises at least one of the first and second detection results. In the case where both the first and second detection results are selected, the processor generates the data by combining the two detection results and as such the location indicated by the generated data is the result of two different detection principles. For example, where the first detection result indicates a 3D location ($X_1$, $Y_1$, $Z_1$) of the marker and second detection result indicates a 3D location ($X_2$, $Y_2$, $Z_2$) of the marker, the processor can be configured to generate the data by averaging the values of $X_1$ and $X_2$ to obtain a value $X_3$, averaging the values of $Y_1$ and $Y_2$ to obtain a value $Y_3$, and averaging the values of $Z_1$ and $Z_2$ to obtain a value $Z_3$.

Alternatively, since the reliability of the first and second detection modes for accurately detecting the camera-marker separation distance may vary in dependence upon the camera-marker separation distance, in some examples the processor is configured to combine the first and second detection results by respectively weighting the first detection result and the second detection result. For the case, where the first and second detection results are combined, a weighting may be assigned to the two detection results. The weighting assigned to the detection results can be calculated according to the following equations:

$$\text{Weighting for first detection result} = A = P1 - Z1 \quad (1)$$

$$\text{Weighting for second detection result} = B = P2 - Z2, \quad (2)$$

where P1 is the first predetermined threshold distance, Z1 is the camera-marker separation distance indicated by the first detection result, P2 is the second predetermined threshold distance, and Z2 is the camera-marker separation distance indicated by the second detection result. Therefore, the processor can be configured to combine the first and second detection results by weighting the first detection result using the weighting factor A, and weighting the second detection result using the weighting factor B.

In this way, when the two detection results are combined, the first detection result has a smaller weighting than the second detection result for the case where the camera-marker separation distance is slightly greater than the first predetermined threshold distance (P1). Conversely, the second detection result has a smaller weighting than the first detection result for the case where the camera-marker separation distance is slightly less than the second predetermined threshold distance (P2). Using equations (1) and (2) to calculate the weighting factors in this manner allows the weights assigned to the two detection results to vary linearly with respect to the camera-marker separation distance, so that a maximum weighting is achieved for the first detection result when the weighting for the second detection result is a minimum and vice versa, and both detection results have an approximately equal weighting when the camera-marker separation distance is approximately equal to the mid-point between P1 and P2.

Figure 22:
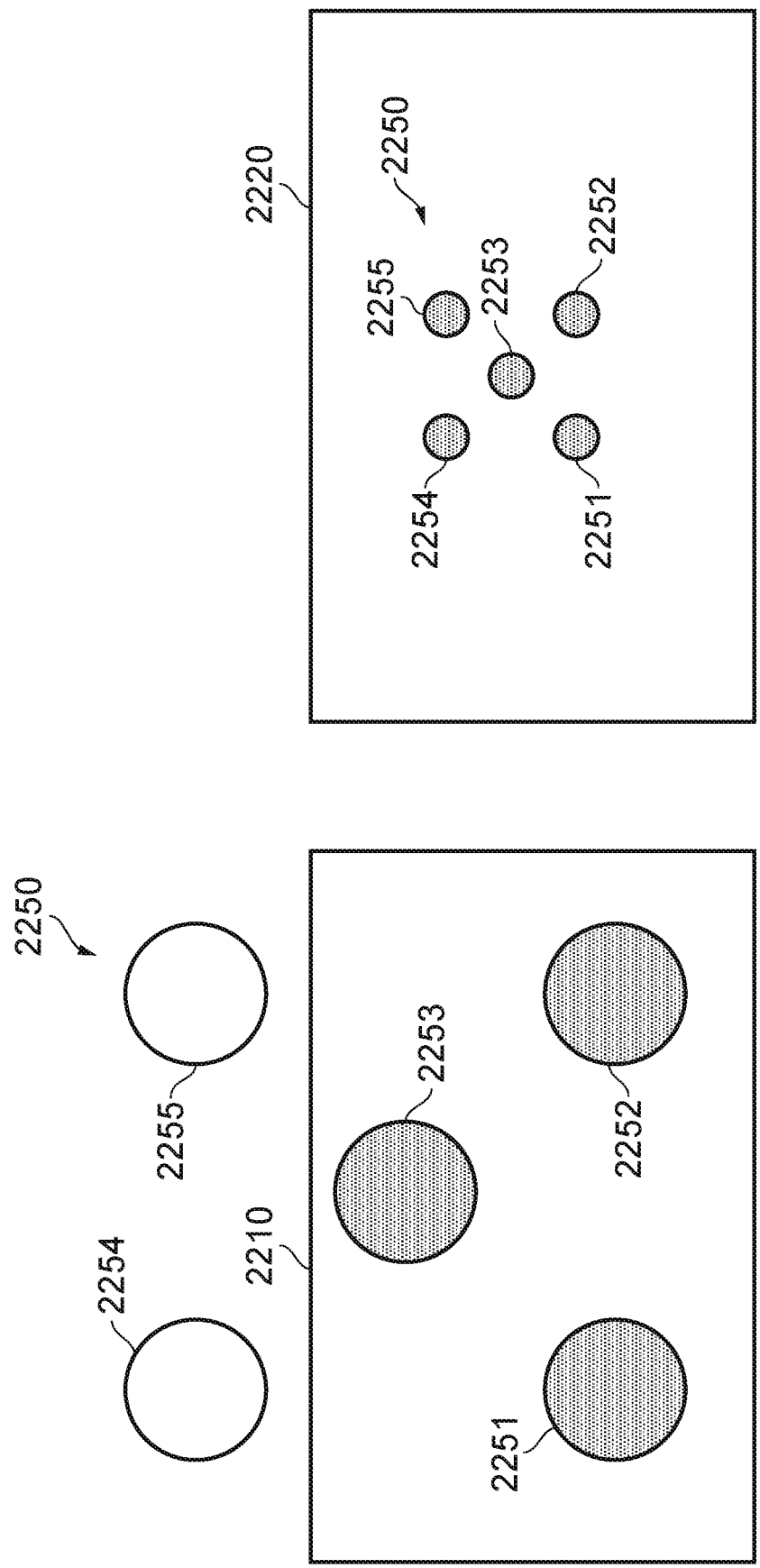
FIG. 22 schematically illustrates two images including the same optically detectable marker at different camera-marker separation distances.

In embodiments of the disclosure, the processor 1840 is configured to select the first detection result in dependence upon whether a number of the respective predetermined elements included in the image of the optically detectable marker is greater than a predetermined number. FIG. 22 schematically illustrates two images 2210, 2220 including the same optically detectable marker 2250 at different camera-marker separation distances. In the image 2210, the marker-camera separation distance means that not all portions of the marker 2250 can be included in the image 2210. The predetermined elements 2251, 2252 and 2253 are included in the image whereas the predetermined elements 2254 and 2255 are not included in the image. However, in the image 2220 the marker-camera separation distance is such that the entirety of the marker 2250 is included in the image.

As discussed previously, the first detection mode can be reliably performed when the entirety of the marker 2250 is included in the image, such that the image 2220 can provide a reliable first detection result. As the marker approaches the camera, the number of predetermined elements forming the marker which are included the image will decrease and when the number of predetermined elements decreases below a threshold number the reliability of the first detection mode is significantly reduced. The number of predetermined elements required to generate a suitably reliable first detection result may vary depending on the properties of the marker, such as the relative positions of the predetermined elements and/or the shapes and/or colours of the predetermined elements. Hence, even though the image 2210 can be used to generate the first detection result, the number of predetermined elements included in the image may be such that the reliability of the first detection result is significantly reduced.

Therefore, the processor 1840 can be configured to select the first detection result based on whether the number of predetermined elements included in the image is suitable for using the first detection principle to detect the location of the marker relative to the camera. The predetermined number of predetermined elements needed to ensure the reliability of the first detection mode is determined according to the properties of the marker and may be different for different markers.

It will be appreciated that the processor 1840 can be configured to select the first detection result in dependence upon whether the number of the respective predetermined elements included in the image of the optically detectable marker is greater than the predetermined number or in dependence upon whether the distance between the camera and the marker is greater than the first predetermined threshold distance (P1). In other words, instead of using the first predetermined threshold distance to determine whether to select the first detection result, as illustrated in FIGS. 20 and 21, the processor 1840 may instead apply a criterion of whether the number of predetermined elements included in the image of the marker is greater than the predetermined number.

Alternatively, the processor 1840 can be configured to perform processing in accordance with the steps illustrated in FIG. 21 to select first detection result and/or the second detection result, and in addition the processor 1840 may also apply the criterion of whether number of the respective predetermined elements included in the image of the optically detectable marker is greater than the predetermined number at the step 2102 to determine whether to select the first detection result. As such, the condition that the camera-marker separation distance is greater than the first predetermined threshold distance (P1) and the condition that the number of predetermined elements included in the image exceeds the predetermined number may be used together in combination when determining whether to select the first detection result.

Figure 23:
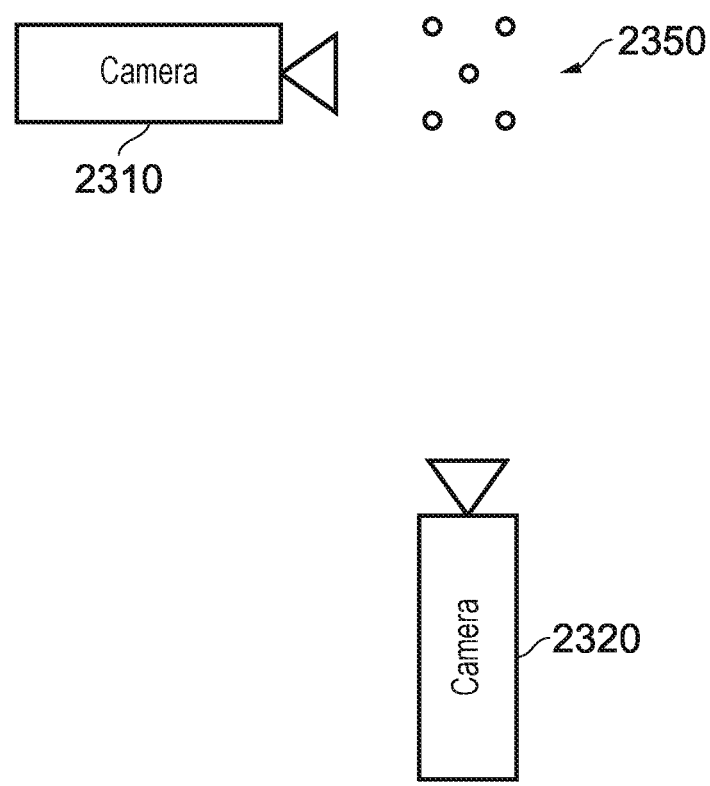
FIG. 23 schematically illustrates an image capture unit comprising two cameras.

As discussed previously with reference to FIG. 18*b*, the data processing apparatus may comprise an image capture unit 1850. In embodiments of the disclosure, the image capture unit is mounted on or proximate to one or more from the list consisting of: a head mountable display; a handheld controller; and a game console. The image capture unit 1850 comprises at least one camera. Referring now to FIG. 23, the image capture unit 1850 may comprise a first camera 2310 and a second camera 2320. The first camera 2310 and the second camera 2320 may be used to capture images of the same optical marker 2350. Image data from each of the first camera 2310 and the second camera 2320 can be analysed by the data processing apparatus 1800 in accordance with the steps illustrated in FIG. 21. Therefore, the image data from the first camera 2310 can be analysed by the analyser 1810 and at least one of the first and second detection results can be selected by the processor 1840 according to the steps illustrated in FIG. 21 to generate data indicative of the location of the marker 2350 with respect to the location of the first camera 2310. In addition, the image data from the second camera 2320 can be analysed by the analyser 1810 and at least one of the first and second detection results can be selected by the processor 1840 according to the steps illustrated in FIG. 21 to generate data indicative of the location of the marker 2350 with respect to the location of the second camera 2320.

Whereas the first camera 2310 is close the marker 2350, and may therefore only capture an image of certain portions of the marker, the second camera 2320 is located further from the marker 2350 and may therefore capture an image including the entirety of the marker 2350. Using the mapping between the respective camera coordinate systems, images captured by the first and second cameras 2310, 2320 can be correlated so that a correspondence between a predetermined element in an image captured by the first camera 2310 and the same predetermined element in an image captured by the second camera 2320 can be determined and tracking of the predetermined element based on image data from both the first camera 2310 and the second camera 2320 can be used for tracking the location of the marker with respect to the camera coordinate systems.

In embodiments of the disclosure, the data processing apparatus 1800 comprises the image capture unit 1850, wherein the image capture unit 1850 comprises cameras arranged according to a stereoscopic camera setup and the second location detector 1830 is configured to detect a depth of a respective predetermined element based on stereoscopic images. Using a stereoscopic camera, a depth of a predetermined element can be detected based on a disparity between two images forming a stereoscopic image pair. Therefore, a depth can be associated with a predetermined element in the captured images and the second location detector 1830 can generate the second detection result accordingly.

In embodiments of the disclosure, the second location detector 1830 is configured to generate the second detection result in dependence upon a depth of each predetermined element in the captured images and a shape of each predetermined element of the optically detectable marker in the images captured by the respective cameras.

Figure 24:
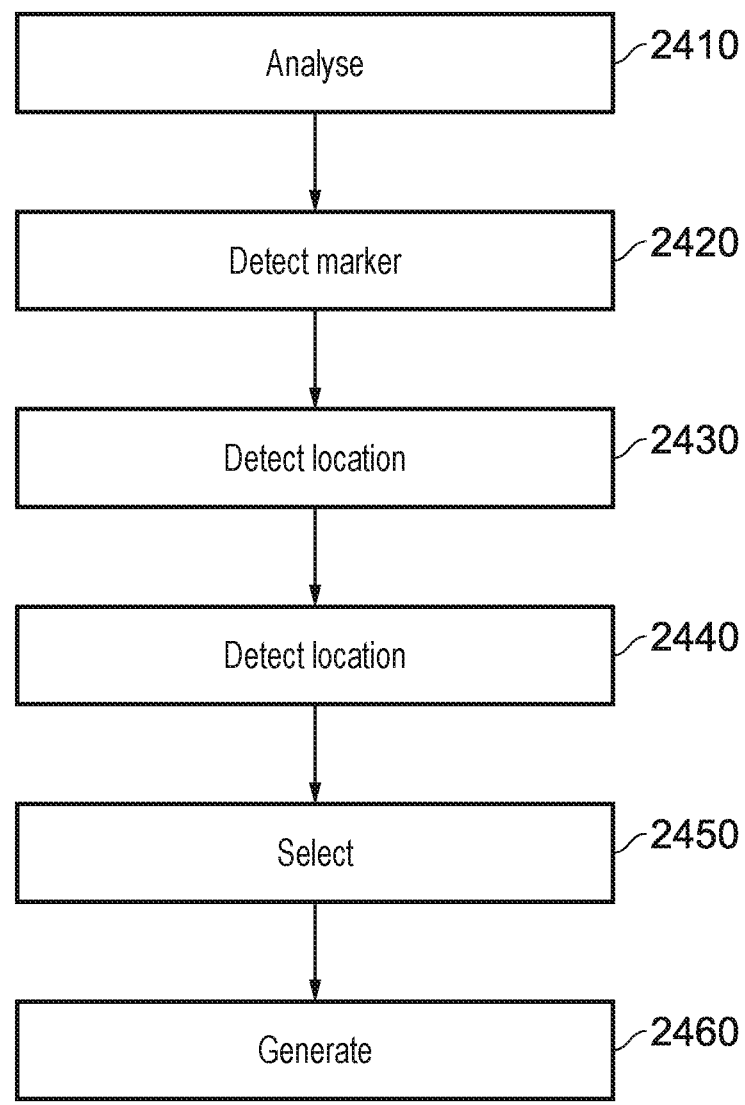
FIG. 24 is a schematic flowchart illustrating a method of generating data.

FIG. 24 is a schematic flowchart illustrating a method of generating data indicative of a location of the optically detectable marker with respect to a location of the camera, which can be carried out by the data processing apparatus 1800. The method comprises:

analysing (at a step 2410) successive images captured by a camera;

detecting (at a step 2420) an optically detectable marker in the captured images;

detecting (at a step 2430) a location of the optically detectable marker with respect to a location of the camera according to a first detection mode and generating a first detection result;

detecting (at a step 2440) the location of the optically detectable marker with respect to the location of the camera according to a second detection mode different to the first detection mode and generating a second detection result;

selecting (at a step 2450) at least one of the first detection result and the second detection result; and generating (at a step 2460) data indicative of the location of the optically detectable marker with respect to the location of the camera based on the based on the selection.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. A data processing apparatus comprising:
an analyser to analyse successive images captured by a camera and to detect an optically detectable marker in the captured images;
a first location detector to detect a location of the optically detectable marker with respect to a location of the camera according to a first detection mode and to generate a first detection result;
a second location detector to detect the location of the optically detectable marker with respect to the location of the camera according to a second detection mode different to the first detection mode and to generate a second detection result; and
a processor to select at least one of the first detection result and the second detection result and to generate data indicative of the location of the optically detectable marker with respect to the location of the camera based on the selection,
wherein the optically detectable marker comprises a plurality of predetermined elements positioned relative to each other to define a size of the optically detectable marker, and at least one of:
(i) the first location detector is configured to detect the location of the optically detectable marker according to the first detection mode based on a size of the optically detectable marker in the captured images, the size of the optically detectable marker in the captured images is dependent upon the distance between the respective predetermined elements, and the first location detector is configured to detect a distance between respective predetermined elements of the optically detectable marker in the captured images, to compare the distance with a predefined model of the optically detectable marker and to generate the first detection result indicative of the location of the optically detectable marker with respect to the location of the camera; and
(ii) the second location detector is configured to detect the location of the optically detectable marker according to the second detection mode based on a shape of a respective predetermined element of the optically detectable marker in the captured images, and the second location detector is configured to detect the shape of at least one predetermined element in the captured images, to compare the shape with a predefined model of the optically detectable marker, and to generate the second detection result indicative of the location of the optically detectable marker with respect to the location of the camera.

2. A data processing apparatus according to claim 1, wherein the processor is configured to select at least one of the first detection result and the second detection result based on a distance between the camera and the optically detectable marker.

3. A data processing apparatus according to claim 2, wherein the first detection result is selected when the distance between the camera and the optically detectable marker is greater than a first predetermined threshold distance.

4. A data processing apparatus according to claim 3, wherein a value of the first predetermined threshold distance is set in dependence upon at least one of a size of the optically detectable marker and an angle associated with a field of view of the camera.

5. A data processing apparatus according to claim 2, wherein the second detection result is selected when the distance between the camera and the optically detectable marker is less than a second predetermined threshold distance.

6. A data processing apparatus according to claim 5,
wherein the first predetermined threshold distance is less than the second predetermined threshold distance, and
wherein both the first detection result and the second detection result are selected when the distance between the camera and the optically detectable marker is greater than the first predetermined threshold distance and less than the second predetermined threshold distance.

7. A data processing apparatus according to claim 6, wherein when both the first detection result and the second detection result are selected, the processor is configured to generate the data indicative of the location of the optically detectable marker by combining the first detection result and the second detection result to generate the data indicative of the location of the optically detectable marker with respect to the location of the camera.

8. A data processing apparatus according to claim 1, wherein the first detection result is indicative of a first distance between the camera and the optically detectable marker, and the second detection result is indicative of a second distance between the camera and the optically detectable marker.

9. A data processing apparatus according to claim 1, wherein the processor is configured to select the first detection result in dependence upon whether a number of the respective predetermined elements included in the image of the optically detectable marker is greater than a predetermined number.

10. A data processing apparatus according to claim 1, comprising an image capture unit configured to capture the successive images.

11. A data processing apparatus according to claim 10, wherein the image capture unit comprises a plurality of cameras arranged according to a predetermined configuration, each camera having a coordinate system, and wherein a mapping between the coordinate systems for the cameras is dependent upon the predetermined configuration.

12. A data processing apparatus according to claim 11, wherein the cameras are arranged according to a stereoscopic camera setup and the second location detector is configured to detect a depth of a respective predetermined element based on stereoscopic images.

13. A data processing apparatus according to claim 11, wherein the second location detector is configured to generate the second detection result in dependence upon a depth of each predetermined element in the captured images and a shape of each predetermined element of the optically detectable marker in the images captured by the respective cameras.

14. A method comprising:
analysing successive images captured by a camera;
detecting an optically detectable marker in the captured images;
detecting a location of the optically detectable marker with respect to a location of the camera according to a first detection mode and generating a first detection result;
detecting the location of the optically detectable marker with respect to the location of the camera according to a second detection mode different to the first detection mode and generating a second detection result;
selecting at least one of the first detection result and the second detection result; and
generating data indicative of the location of the optically detectable marker with respect to the location of the camera based on the based on the selection,
wherein the optically detectable marker comprises a plurality of predetermined elements positioned relative to each other to define a size of the optically detectable marker, and at least one of:
(i) the detecting the location of the optically detectable marker with respect to the location of the camera according to the first detection mode and generating the first detection result, includes:
detecting the location of the optically detectable marker according to the first detection mode based on a size of the optically detectable marker in the captured images, where the size of the optically detectable marker in the captured images is dependent upon the distance between the respective predetermined elements,
detecting a distance between respective predetermined elements of the optically detectable marker in the captured images,
comparing the distance with a predefined model of the optically detectable marker, and generating the first detection result indicative of the location of the optically detectable marker with respect to the location of the camera; and (ii) the detecting the location of the optically detectable marker with respect to the location of the camera according to the second detection and generating the second detection result, includes:

detecting the location of the optically detectable marker according to the second detection mode based on a shape of a respective predetermined element of the optically detectable marker in the captured images, detecting the shape of at least one predetermined element in the captured images, comparing the shape with a predefined model of the optically detectable marker, and generating the second detection result indicative of the location of the optically detectable marker with respect to the location of the camera.

15. A non-transitory machine-readable storage medium which stores computer software which, when executed by a computer, causes the computer to perform a method for:

analysing successive images captured by a camera;

detecting an optically detectable marker in the captured images;

detecting a location of the optically detectable marker with respect to a location of the camera according to a first detection mode and generating a first detection result;

detecting the location of the optically detectable marker with respect to the location of the camera according to a second detection mode different to the first detection mode and generating a second detection result;

selecting at least one of the first detection result and the second detection result; and generating data indicative of the location of the optically detectable marker with respect to the location of the camera based on the based on the selection, wherein the optically detectable marker comprises a plurality of predetermined elements positioned relative to each other to define a size of the optically detectable marker, and at least one of:

(i) the detecting the location of the optically detectable marker with respect to the location of the camera according to the first detection mode and generating the first detection result, includes:

detecting the location of the optically detectable marker according to the first detection mode based on a size of the optically detectable marker in the captured images, where the size of the optically detectable marker in the captured images is dependent upon the distance between the respective predetermined elements, detecting a distance between respective predetermined elements of the optically detectable marker in the captured images, comparing the distance with a predefined model of the optically detectable marker, and generating the first detection result indicative of the location of the optically detectable marker with respect to the location of the camera; and (ii) the detecting the location of the optically detectable marker with respect to the location of the camera according to the second detection and generating the second detection result, includes:

detecting the location of the optically detectable marker according to the second detection mode based on a shape of a respective predetermined element of the optically detectable marker in the captured images, detecting the shape of at least one predetermined element in the captured images, comparing the shape with a predefined model of the optically detectable marker, and generating the second detection result indicative of the location of the optically detectable marker with respect to the location of the camera.

* * * * *